United States Patent
Hayashi et al.

(10) Patent No.: US 11,614,838 B2
(45) Date of Patent: Mar. 28, 2023

(54) INPUT DETECTION SYSTEM WITH INPUT DEVICE MOUNTED ON COVER AND ELECTRONIC APPARATUS CASE WITH THE SAME

(71) Applicant: Japan Display Inc., Tokyo (JP)

(72) Inventors: Makoto Hayashi, Tokyo (JP); Yuto Kakinoki, Tokyo (JP); Takaaki Kono, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/723,738

(22) Filed: Apr. 19, 2022

(65) Prior Publication Data

US 2022/0342506 A1    Oct. 27, 2022

(30) Foreign Application Priority Data

Apr. 22, 2021 (JP) .............................. JP2021-072517

(51) Int. Cl.
| | |
|---|---|
| *G06F 3/044* | (2006.01) |
| *G06F 3/041* | (2006.01) |
| *G06F 1/16* | (2006.01) |
| *G09G 3/00* | (2006.01) |

(52) U.S. Cl.
CPC .......... *G06F 3/0442* (2019.05); *G06F 1/1656* (2013.01); *G06F 3/0412* (2013.01); *G06F 3/0443* (2019.05); *G09G 3/00* (2013.01); *G09G 2320/08* (2013.01)

(58) Field of Classification Search
None
See application file for complete search history.

(56) References Cited

U.S. PATENT DOCUMENTS

| | | | |
|---|---|---|---|
| 5,936,613 A * | 8/1999 | Jaeger ................. | G02F 1/13306 345/184 |
| 10,921,913 B1 * | 2/2021 | Fong ..................... | G06F 3/0442 |
| 2018/0284841 A1 * | 10/2018 | Lee ......................... | H04M 1/04 |
| 2019/0150308 A1 * | 5/2019 | Takahashi ............ | G06F 1/1626 361/679.01 |
| 2020/0301547 A1 | 9/2020 | Mori et al. | |
| 2021/0232269 A1 | 7/2021 | Sasaki et al. | |

FOREIGN PATENT DOCUMENTS

| | | | |
|---|---|---|---|
| JP | 6342105 B1 | 5/2018 | |
| JP | 6532631 B1 | 5/2019 | |

OTHER PUBLICATIONS

Sakitech https://www.youtube.com/watch?v=N_q6WfjwhlA (Year: 2020).*
TechDaily https://www.youtube.com/watch?v=pWqoLVCCjK4 (Year: 2019).*

\* cited by examiner

*Primary Examiner* — Chad M Dicke
(74) *Attorney, Agent, or Firm* — K&L Gates LLP

(57) ABSTRACT

An input detection system includes a display device with a detection function that includes a plurality of detection electrodes arrayed in a display region, an electronic apparatus case including an accommodation portion accommodating the display device with the detection function and a cover covering the display region of the display device with the detection function, and an input device that is mounted on the cover of the electronic apparatus case so as to rotate around a rotating axis extending in a normal direction to a surface of the cover and includes a first electrode and a second electrode facing the detection electrodes.

10 Claims, 17 Drawing Sheets

INPUT DETECTION SYSTEM WITH INPUT DEVICE MOUNTED ON COVER AND ELECTRONIC APPARATUS CASE WITH THE SAME

CROSS-REFERENCE TO RELATED APPLICATION

This application claims the benefit of priority from Japanese Patent Application No. 2021-072517 filed on Apr. 22, 2021, the entire contents of which are incorporated herein by reference.

BACKGROUND

1. Technical Field

The present disclosure relates to an input detection system and an electronic apparatus case.

2. Description of the Related Art

Japanese Patent Nos. 6342105 and 6532631 describe an input support device (referred to as an operation knob or a knob in Japanese Patent Nos. 6342105 and 6532631) that is placed on a touch panel configured to detect change in electrostatic capacitance or change in a contact region and supports input operations through the touch panel. An electronic apparatus case such as a flip cover can be mounted on the touch panel.

In an input detection system including the input support device and the touch panel as described above, it is required to enable the input operations with the input support device even when a cover of the electronic apparatus case is provided so as to cover a display region of the touch panel (hereinafter, referred to as a closed state).

SUMMARY

An input detection system according to an embodiment of the present disclosure includes a display device with a detection function that includes a plurality of detection electrodes arrayed in a display region, an electronic apparatus case including an accommodation portion accommodating the display device with the detection function and a cover covering the display region of the display device with the detection function, and an input device that is mounted on the cover of the electronic apparatus case so as to rotate around a rotating axis extending in a normal direction to a surface of the cover and includes a first electrode and a second electrode facing the detection electrodes.

An electronic apparatus case according to an embodiment to accommodate a display device with a detection function is disclosed. The display device includes a plurality of detection electrodes arrayed in a display region. The electronic apparatus case includes an accommodation portion accommodating the display device with the detection function, a cover covering the display region of the display device with the detection function, and an input device that is mounted on the cover so as to rotate around a rotating axis extending in a normal direction to a surface of the cover and includes a first electrode and a second electrode facing the detection electrodes.

DETAILED DESCRIPTION

Figure 1:
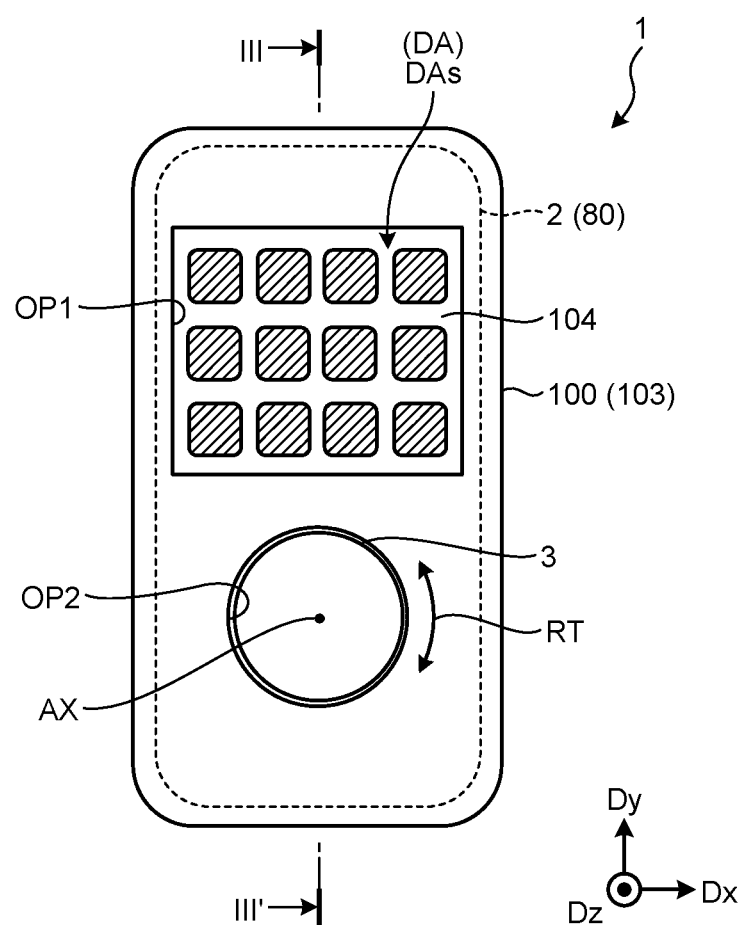
FIG. 1 is a plan view schematically illustrating an input detection system according to a first embodiment when a cover is in a closed state.

Aspects for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the invention, when representing an aspect in which one structure is arranged above another structure, simple expression "above" includes both of the case in which the one structure is arranged directly on the other structure so as to be in contact with the other structure and the case in which the one structure is arranged above the other structure with yet another structure interposed therebetween unless otherwise specified.

First Embodiment

Figure 2:
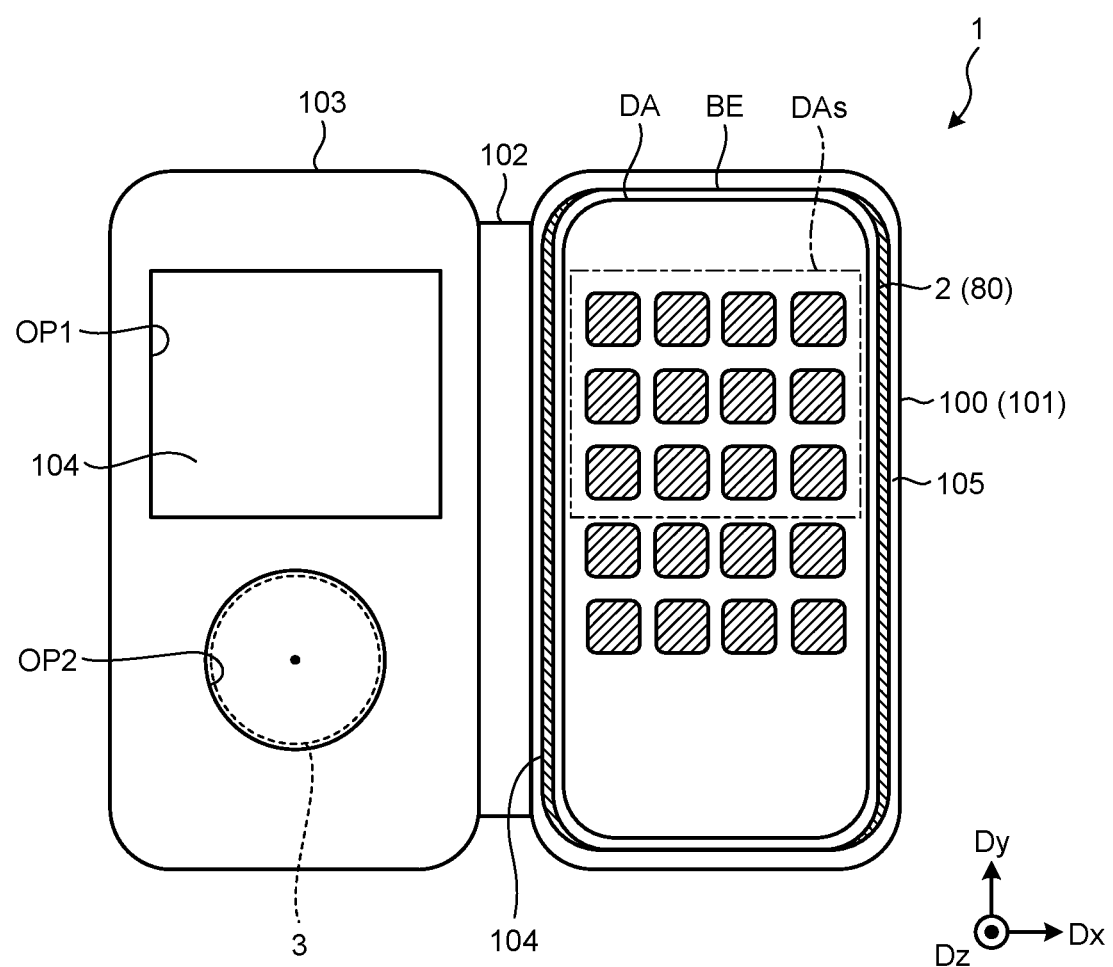
FIG. 2 is a plan view schematically illustrating the input detection system in the first embodiment when the cover is in an open state.

FIG. 1 is a plan view schematically illustrating an input detection system according to a first embodiment when a cover is in a closed state. FIG. 2 is a plan view schematically illustrating the input detection system in the first embodiment when the cover is in an open state. As illustrated in FIG. 1 and FIG. 2, an input detection system 1 includes a display device 2 (display terminal 80), an input support device 3, and an electronic apparatus case 100.

The display device 2 is, for example, a liquid crystal display (LCD). The display device 2 is however not limited thereto and may be, for example, an organic electro-luminescence (EL) display panel (organic light emitting diode (OLED)) or an inorganic EL display (micro LED, mini LED). Alternatively, the display device 2 may be an electrophoretic display (EPD) that uses electrophoretic elements as display elements.

The display device 2 is a display device with a detection function that includes drive electrodes Tx and detection electrodes Rx (refer to FIG. 3) and has functions as a mutual electrostatic capacitance-type touch panel. In the present embodiment, some of the electrodes and wiring of the display device 2 are shared by electrodes (drive electrodes Tx) and wiring of the touch panel.

As illustrated in FIG. 2, a peripheral region BE is provided on the outer side of a display region DA in the display device 2. The display region DA is formed to have a substantially square shape with curved corners but the outer shape of the display region DA is not limited thereto. For example, the outer shape of the display region DA may be a square shape, or the display region DA may be formed into another polygonal shape. Alternatively, the display region DA may be formed into another shape such as a circular shape and an elliptic shape. The outer shape of the display region DA may have a cutout.

The display region DA is a region in which a plurality of pixels PX (sub pixels SPX) (refer to FIG. 4) are provided. The display region DA is a region in which the drive electrodes Tx and the detection electrodes Rx (refer to FIG. 4) are provided and is also regarded as a detection region. The peripheral region BE indicates a region on the inner side of the outer circumference of the display device 2 and on the outer side of the display region DA. The peripheral region BE may have a frame shape surrounding the display region DA, and in this case, the peripheral region BE can also be referred to as a frame region.

In the following explanation, one direction of a plane (display region DA) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of the display device 2.

The electronic apparatus case 100 is a case for accommodating and protecting the display device 2 (display terminal 80) and is also referred to as a notebook-type case or a flip cover. As illustrated in FIG. 2, the electronic apparatus case 100 includes a base 101, a folded portion 102, a cover 103, and a fixing portion 105. The folded portion 102 is provided between the base 101 and the cover 103 when the cover 103 is in an open state. The folded portion 102 is made of a deformable material, and the electronic apparatus case 100 is provided such that the cover 103 can be opened and closed.

In the following explanation, the "closed state" of the cover 103 indicates a state where the cover 103 is folded and covers the display region DA of the display device 2 (refer to FIG. 1). The "open state" of the cover 103 indicates a state where the cover 103 is separated from the display region DA of the display device 2 (refer to FIG. 2). An operator can view a displayed image in the display region DA or perform touch operations on the display region DA by bringing the cover 103 into the open state.

The fixing portion 105 is provided on the base 101. The fixing portion 105 is a member that holds the display device 2 between parts thereof in the first direction Dx. The base 101 and the fixing portion 105 function as an accommodation portion accommodating the display device 2. In FIG. 2, the fixing portion 105 extends along the outer edge of the display device 2 in the second direction Dy. The fixing portion 105 can however have any configuration as long as it can hold the display device 2. The fixing portion 105 can be appropriately modified in accordance with the configuration of the display device 2 and the presence or absence and arrangement of side switches and the like.

As illustrated in FIG. 1, the cover 103 is made of a light non-transmitting material and is provided so as to cover the display region DA of the display device 2 in the closed state. The cover 103 has a display opening OP1 and a mounting opening OP2. Each of the display opening OP1 and the mounting opening OP2 is provided in a region overlapping with a part of the display region DA, and in the example illustrated in FIG. 1, they are provided next to each other in the second direction Dy. A protective film 104 is provided on the surface of the cover 103 that faces the display region DA. The protective film 104 is made of a light transmitting resin material and is provided so as to cover the display opening OP1 and the mounting opening OP2.

The operator can view a partial region (hereinafter, referred to as an opening region DAs) of the display region DA through the display opening OP1 when the cover 103 is in the closed state. The input support device 3 is provided in a region overlapping with the mounting opening OP2.

As illustrated in FIG. 1, the input support device 3 is arranged overlapping with the display region DA of the display device 2 when the cover 103 is in the closed state. More in detail, the input support device 3 is arranged (mounted) on an upper surface 111a of a cover member 111 (refer to FIG. 3) when the cover 103 is in the closed state. The operator can perform input operations on the display device 2 by operating the input support device 3 arranged above the display device 2 when the cover 103 is in the closed state. The input support device 3 is, for example, a rotary knob and has a circular shape in a plan view when seen from the third direction Dz. The display device 2 can detect the presence or absence of the input support device 3 on the display region DA and a rotation operation RT centered on a rotating axis AX.

Although the rotary knob is illustrated as the input support device 3 in FIG. 1, the input support device 3 is not limited thereto and may be another input support device such as a slider, an input button, or an input key, for example.

Figure 3:
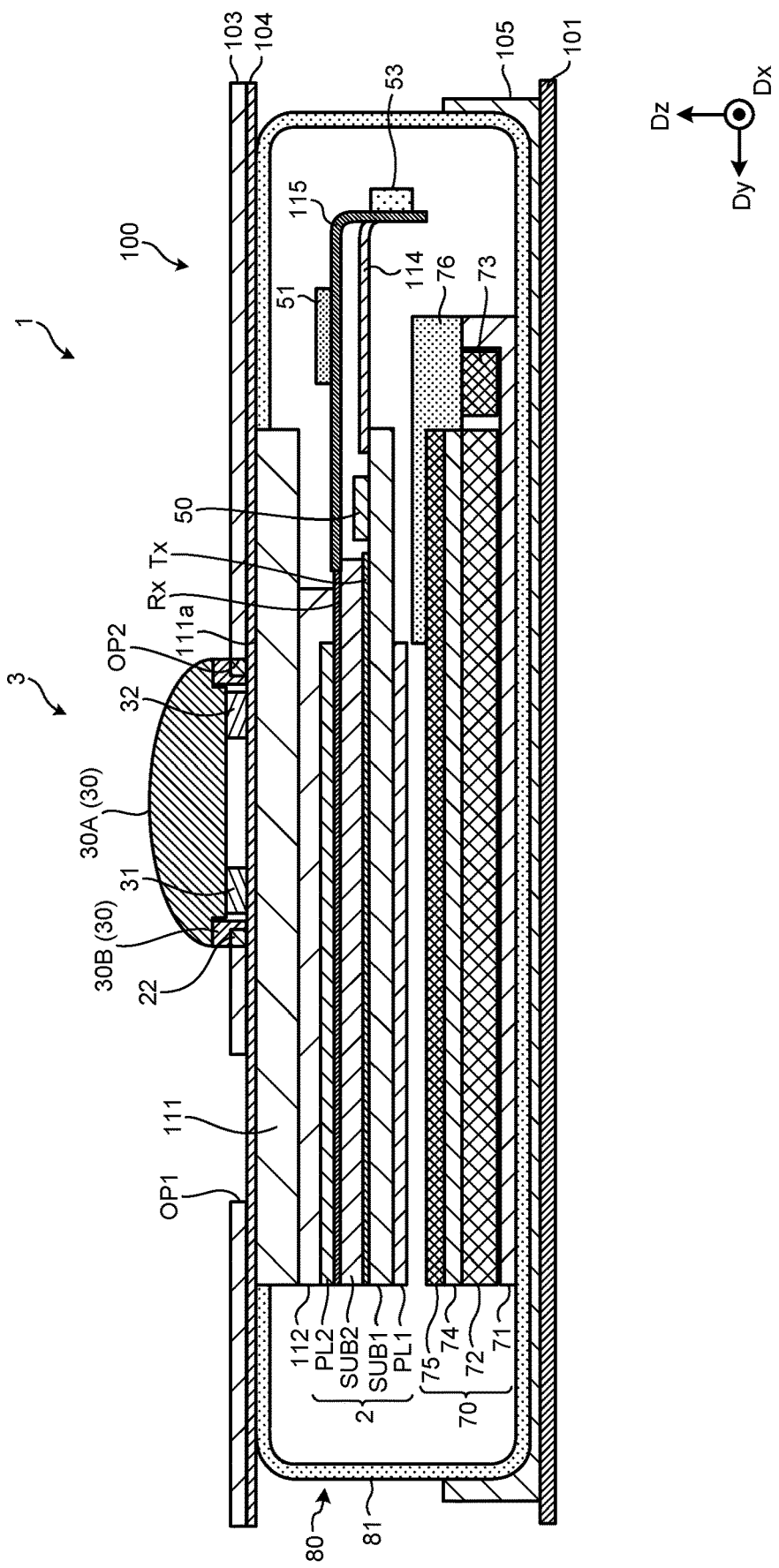
FIG. 3 is a cross-sectional view cut along line III-III' in FIG. 1.

FIG. 3 is a cross-sectional view cut along line III-III' in FIG. 1. As illustrated in FIG. 3, the display terminal 80 includes the display device 2, a backlight 70, a housing 81, and the cover member 111. The display device 2, the backlight 70, and the cover member 111 are accommodated in the housing 81. The housing 81 is fixed onto the base 101 of the electronic apparatus case 100, and the backlight 70, the display device 2, and the cover member 111 are stacked in this order on a bottom portion of the housing 81. In the present specification, the direction toward the cover member 111 from the display device 2 in the direction perpendicular to the upper surface 111a of the cover member 111 is an "upper-side" or simply an "above". The direction toward the display device 2 from the cover member 111 is a "lower-side" or simply a "downward". The expression "plan view" indicates a positional relation when seen from the direction perpendicular to the upper surface 111a of the cover member 111.

The display device 2 includes an array substrate SUB1, a counter substrate SUB2, a first polarizing plate PL1, and a second polarizing plate PL2. The first polarizing plate PL1, the array substrate SUB1, the counter substrate SUB2, and the second polarizing plate PL2 are stacked in this order in the third direction Dz.

The array substrate SUB1 is a drive circuit substrate for driving the pixels. The drive electrodes Tx are provided above the array substrate SUB1. The counter substrate SUB2 is provided so as to face the array substrate SUB1. A liquid crystal layer as a display function layer is provided between the array substrate SUB1 and the counter substrate SUB2. The detection electrodes Rx are provided above the counter substrate SUB2.

A display integrated circuit (IC) 50 and a wiring substrate 114 are coupled to a protruding portion of the array substrate SUB1. The display IC 50 includes a control circuit that controls display of the display device 2 and touch detection. The display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 55 (refer to FIG. 5) and receives supply of detection signals Vdet from the detection electrodes Rx. The detection IC 51 can detect a detection target such as a finger and the input support device 3 based on the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is configured by, for example, flexible printed circuits (FPC).

The backlight 70 is provided on the lower side of the display device 2. The backlight 70 includes a frame 71, a light guide plate 72, a light source 73, a diffusion sheet 74, a lens sheet 75, and a light shielding layer 76.

The frame 71 is a member that accommodates therein the light guide plate 72, the light source 73, the diffusion sheet 74, and the lens sheet 75. The light guide plate 72, the diffusion sheet 74, and the lens sheet 75 are stacked in this order above the frame 71. The light source 73 includes, for example, a light-emitting element such as an LED and is arranged on the lateral side of the light guide plate 72. The light shielding layer 76 is provided so as to cover a part of the light source 73 and the lens sheet 75.

Light emitted from the light source 73 travels in the light guide plate 72 while being reflected multiple times and is output from the upper surface of the light guide plate 72 toward the display device 2. The diffusion sheet 74 diffuses light output from the light guide plate 72. The lens sheet 75 increases the directivity of light from the diffusion sheet 74. Optical function layers such as the diffusion sheet 74 and the lens sheet 75 are provided as needed. Equal to or more than three optical function layers may be provided or they may be omitted. The backlight 70 illustrated in FIG. 3 is merely an example, and a backlight having another configuration may be used.

The cover member 111 is bonded onto the display device 2 through an adhesive layer 112. For example, a glass substrate or a resin substrate is used for the cover member 111.

When the cover 103 of the electronic apparatus case 100 is in the closed state, the cover 103 and the protective film 104 of the electronic apparatus case 100 are arranged so as to face the upper surface 111a of the cover member 111. More preferably, the protective film 104 of the electronic apparatus case 100 is brought into contact with the upper surface 111a of the cover member 111.

The input support device 3 is arranged in the mounting opening OP2 and is fixed to the protective film 104 with an adhesive layer 22. More in detail, the input support device 3 includes a rotating body 30A, a support body 30B, a first electrode 31, a second electrode 32, and an LC circuit 35 (refer to FIG. 5). The rotating body 30A and the support body 30B are configured as a housing 30 of the input support device 3. The first electrode 31, the second electrode 32, and the LC circuit 35 (refer to FIG. 5) are accommodated in the housing 30.

The support body 30B is an annular member that surrounds the first electrode 31 and the second electrode 32 and is fixed to the protective film 104 through the adhesive layer 22. The rotating body 30A is rotatably supported by the support body 30B. The first electrode 31 and the second electrode 32 are mounted on the lower surface of the rotating body 30A and rotate together with the rotating body 30A. The protective film 104 covers the mounting opening OP2 and is provided at least between the rotating body 30A and the support body 30B and the cover member 111.

With this configuration, the input support device 3 is mounted on the cover 103 of the electronic apparatus case 100. When the cover 103 is in the closed state, the operator can operate the rotating body 30A to perform the rotation operation RT of the input support device 3. Since the mounting opening OP2 is provided in the cover 103 of the electronic apparatus case 100, a distance between the input support device 3 and the display device 2 can be shortened compared to the configuration in which the input support device 3 is mounted on the cover 103 without providing the mounting opening OP2. That is to say, when the cover 103 is in the closed state, a distance between the first electrode 31 and the second electrodes 32 and the drive electrodes Tx and the detection electrodes Rx can be reduced, thereby detecting the input support device 3 preferably.

The input support device 3 may be provided separately from the electronic apparatus case 100 and may be detachably mounted on the cover 103. Alternatively, the input support device 3 may be formed integrally with the electronic apparatus case 100. In this case, the input support device 3 may be one of members configuring the electronic apparatus case 100. The protective film 104 may be eliminated. That is to say, the display opening OP1 and the mounting opening OP2 may be formed so as to penetrate through the cover 103.

Figure 4:
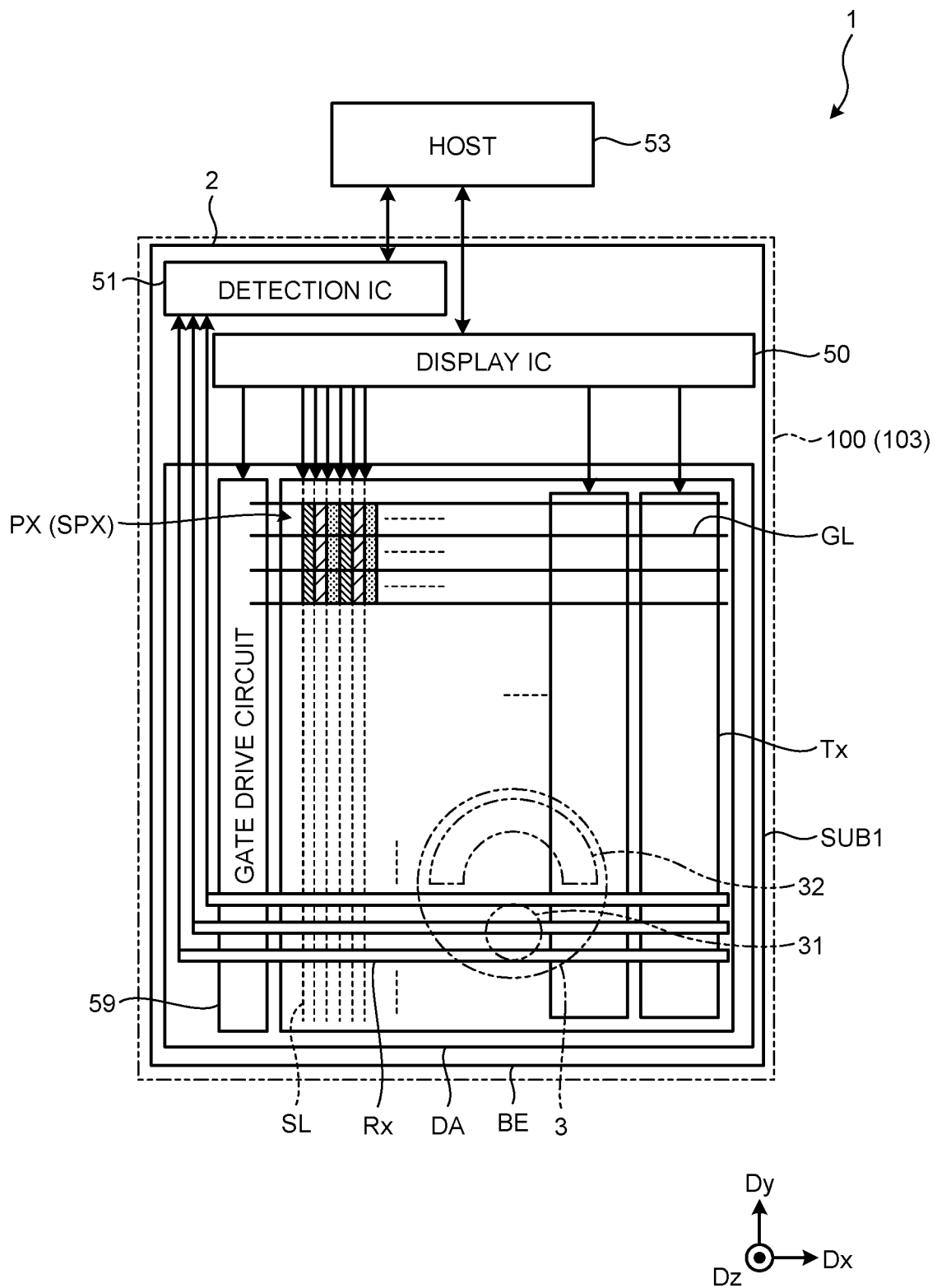
FIG. 4 is a block diagram illustrating an example of the configuration of the input detection system.

FIG. 4 is a block diagram illustrating an example of the configuration of the input detection system. FIG. 4 schematically illustrates some of the drive electrodes Tx provided on the array substrate SUB1 and some of the detection electrodes Rx provided on the counter substrate SUB2 in order to explain a relation between the drive electrodes Tx and the detection electrodes Rx. In FIG. 4, the input support device 3 and the cover 103 of the electronic apparatus case 100 are indicated by chain double-dashed lines in order to make the drawing easy to view.

As illustrated in FIG. 4, the pixels PX (sub pixels SPX) are arrayed in a matrix with a row-column configuration in the display region DA. The pixel signal lines SL and the scan lines GL are provided so as to correspond to the sub pixels SPX. The pixel signal lines SL are coupled to the control circuit such as the display IC 50 provided in the peripheral region BE. A gate drive circuit 59 is provided in a region extending along the second direction Dy in the peripheral region BE. The scan lines GL are coupled to the gate drive circuit 59. The gate drive circuit 59 is a circuit that drives the pixels PX (sub pixels SPX) by supplying a scan signal to the scan lines GL in order.

Each of the drive electrodes Tx extends in the second direction Dy and is aligned in the first direction Dx. The drive electrodes Tx are coupled to the display IC 50 through respective coupling wiring lines. Each of the detection electrodes Rx extends in the first direction Dx and is aligned in the second direction Dy. The detection electrodes Rx are coupled to the detection IC 51 through respective coupling wiring lines. The drive electrodes Tx and the detection electrodes Rx are provided so as to intersect with each other in a plan view. An electrostatic capacitance is formed in each of intersecting portions of the drive electrodes Tx and the detection electrodes Rx. The detection IC 51 can detect the detection target based on the detection signals Vdet that are output in accordance with changes in the mutual electrostatic capacitances between the drive electrodes Tx and the detection electrodes Rx.

Although FIG. 4 illustrates only some drive electrodes Tx, some detection electrodes Rx, and some pixels PX (sub pixels SPX) in order to make the drawing easy to view, the drive electrodes Tx, the detection electrodes Rx, and the pixels PX are arranged on the entire display region DA. That is to say, the pixels PX are arranged so as to overlap with one drive electrode Tx. One drive electrode Tx is arranged so as to overlap with the pixel signal lines SL.

The drive electrodes Tx serve as common electrodes for forming an electric field between the drive electrodes Tx and pixel electrodes (not illustrated) in display and as the drive electrodes Tx for detecting the detection target such as the finger and the input support device 3 in touch detection. To be specific, the display IC 50 supplies a display drive signal VCOM to the drive electrodes Tx in display. The display IC 50 includes at least a drive signal supply circuit 56 (refer to FIG. 15). The drive signal supply circuit 56 supplies a detection drive signal VD to the drive electrodes Tx in order. Details of driving of the drive electrodes Tx will be described later.

The input detection system 1 further includes a host 53. The host 53 is a control circuit that controls the display IC 50 and the detection IC 51. The host 53 receives information about the input support device 3 from the detection IC 51 and outputs a control signal to the display IC 50 to perform display in accordance with the presence or absence of the input support device 3 and the rotation operation RT. The host 53 detects approach of the input support device 3 based on the information from the detection IC 51 and detects the open or closed state of the cover 103 based on the presence or absence of the input support device 3. The host 53 outputs a control signal to at least one of the detection IC 51 and the display IC 50 in accordance with the open or closed state of the cover 103. The display device 2 thereby changes at least one of a touch detection mode and a display mode in accordance with the open or closed state of the cover 103. As illustrated in FIG. 3, the host 53 is coupled to the display IC 50 and the detection IC 51 through the flexible substrates 114 and 115. The host 53 may be provided separately from the display device 2 in the housing 81 and be coupled to the display IC 50 and detection IC 51 of the display device 2 through cables or the like.

The open or closed state of the cover 103 may be detected in any way. For example, the open or closed state of the cover 103 can be detected by a magnet provided on the cover 103 and a magnetic sensor provided on the display device 2. Alternatively, the open or closed state of the cover 103 may be detected by providing a proximity sensor on the display device 2. The detection manner is not limited thereto, and the open or closed state of the cover 103 may be detected by another configuration and another method.

Figure 5:
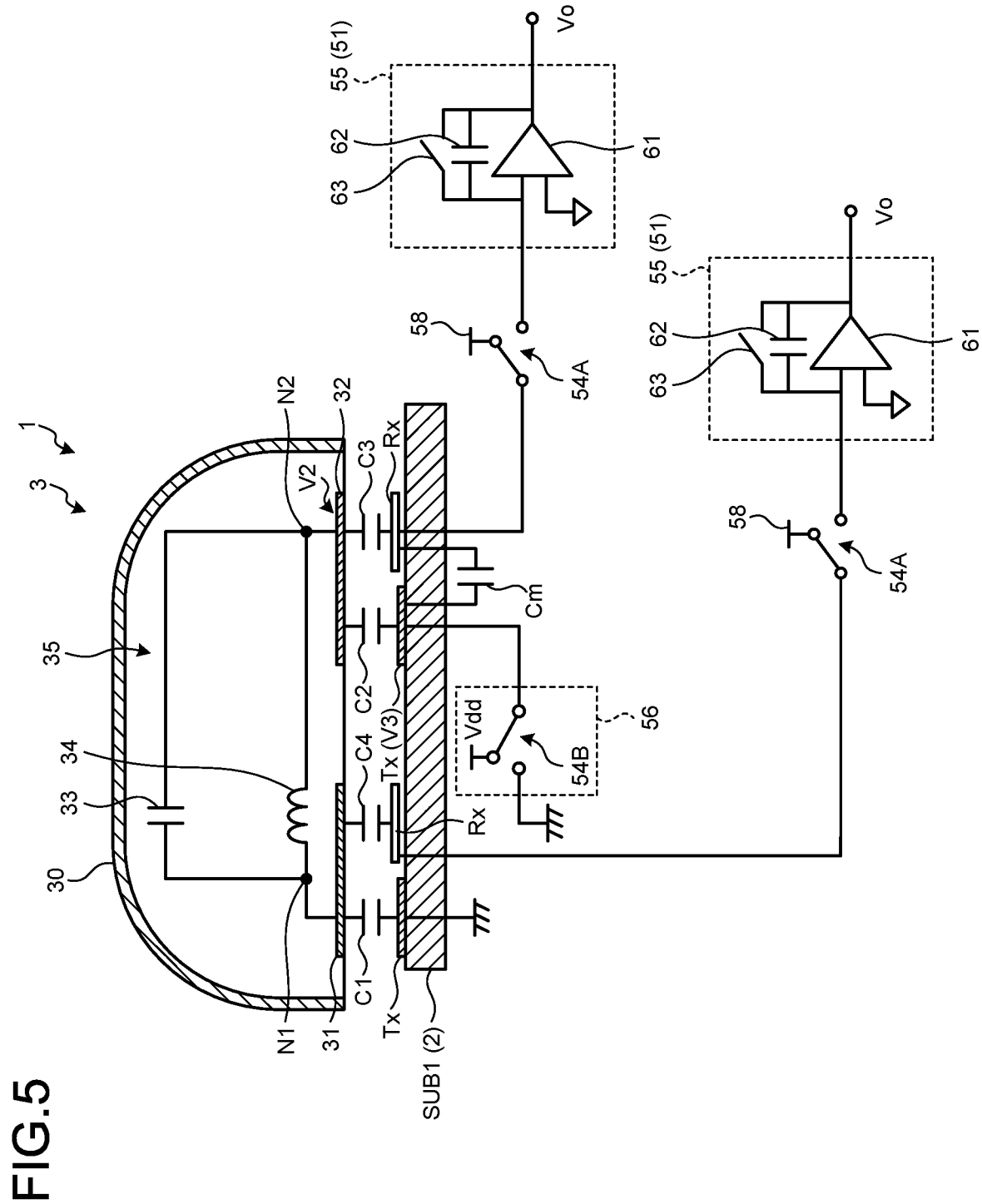
FIG. 5 is a descriptive view for explaining a method for detecting an input support device.

Next, a method for detecting the input support device 3 will be described with reference to FIG. 5 to FIG. 7. FIG. 5 is a descriptive view for explaining the method for detecting the input support device. As illustrated in FIG. 5, the input support device 3 includes the LC circuit 35 installed between the first electrode 31 and the second electrode 32. As illustrated in FIG. 4, the second electrode 32 is larger than the first electrode 31 and has a C shape along the outer shape of the input support device 3. The LC circuit 35 configures an LC resonance circuit in which a capacitor 33 and an inductor 34 are coupled in parallel with each other. The first electrode 31 is coupled to one end side of the LC circuit 35 (coupling portion N1 of the capacitor 33 and the inductor 34 on one end side). The second electrode 32 is coupled to the other end side of the LC circuit 35 (coupling portion N2 of the capacitor 33 and the inductor 34 on the other end side). The display device 2 can detect positions of the first electrode 31 and the second electrode 32 using LC resonance of the LC circuit 35.

When the cover 103 (not illustrated in FIG. 5) of the electronic apparatus case 100 is in the closed state, the first electrode 31 and the second electrode 32 of the input support device 3 face the drive electrodes Tx on the array substrate SUB1 and the detection electrodes Rx on the counter substrate SUB2. A capacitance C1 is formed between the first electrode 31 and one drive electrode Tx (the drive electrode Tx on the left side in FIG. 5). The one drive electrode Tx is coupled to a reference potential (for example, a reference potential Vdc). A capacitance C2 is formed between the second electrode 32 and the other drive electrode Tx (the drive electrode Tx on the right side in FIG. 5). The other drive electrode Tx is coupled to a power supply potential Vdd or the reference potential (for example, the reference potential Vdc) through a switch element 54B.

A capacitance C3 is formed between the second electrode 32 and the detection electrode Rx facing the second electrode 32. Each of the detection electrodes Rx (the detection electrode Rx on the right side in FIG. 7 and the detection electrode Rx on the left side in FIG. 7) is coupled to the detection circuit 55 or another node 58 through each switch element 54A. The node 58 is coupled to, for example, a reference potential GND (for example, a ground potential). The node 58 may be coupled to wiring that is coupled to a non-inverting input portion of a detection signal amplifier 61, which will be described later, instead of the reference potential GND. Thus, when the detection electrode Rx is coupled to the node 58, an output-side potential of the detection electrode Rx becomes the same as a potential of the non-inverting input portion of the detection signal amplifier 61.

A configuration in which the node 58 is coupled to a floating electrode or a high-impedance (Hi-z) circuit or the switch element 54A is not coupled to the node 58 to bring the detection electrode Rx into a floating state in periods other than a period where it is coupled to the detection circuit 55 can be also employed. The switch elements 54A that are respectively coupled to the detection electrodes Rx are controlled to be switched into ON or OFF states synchronously. A mutual electrostatic capacitance Cm is formed between the drive electrode Tx and the detection electrode Rx. A capacitance C4 is formed between the first electrode 31 and the detection electrode Rx facing the first electrode 31.

The detection circuit 55 is a signal processing circuit provided in the detection IC 51 and is a circuit that receives the detection signals Vdet output from the detection electrodes Rx and performs predetermined signal processing thereon to output an output signal Vo. The detection circuit 55 includes the detection signal amplifier 61, a capacitive element 62, and a reset switch 63. The detection circuit 55 is not limited thereto and may further include an A/D conversion circuit (not illustrated) that converts an analog signal output from the detection signal amplifier 61 into a digital signal.

Figure 6:
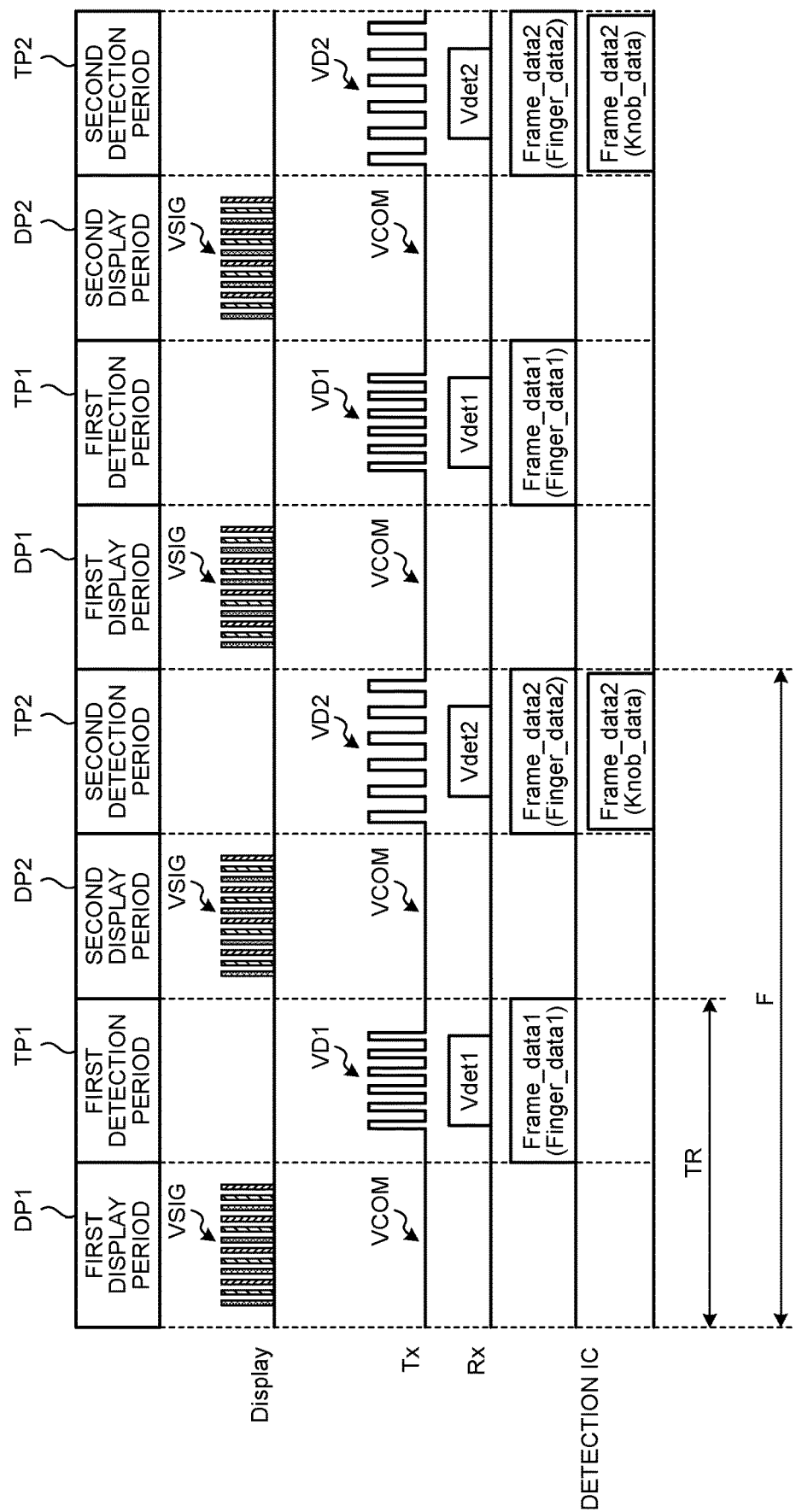
FIG. 6 is a timing waveform chart for explaining a display period and a detection period of the input detection system.

FIG. 6 is a timing waveform chart for explaining a display period and a detection period of the input detection system. As illustrated in FIG. 6, the input detection system 1 executes display operations and detection operations in a time division manner in one frame period F. A first display period DP1, a first detection period TP1, a second display period DP2, and a second detection period TP2 are arranged in this order in the frame period F. Although each display period and each detection period have the same length in FIG. 8, the lengths thereof are schematically illustrated. Actually, any one of each display period and each detection period may be longer than the other one.

The display IC 50 (refer to FIG. 4) supplies image signals VSIG to the pixels PX (sub pixels SPX) through the pixel signal lines SL in the first display period DP1 and the second display period DP2. The display operation (or rewriting operation) of some images among images for one frame is performed in the first display period DP1. The display operation of the remaining images among the images for one frame is performed in the second display period DP2. The display drive signal VCOM is supplied to the drive electrodes Tx in the first display period DP1 and the second display period DP2.

The operations in the first detection period TP1 and the second detection period TP2 when the cover 103 is in the open state will be explained with reference to FIG. 6. When the cover 103 is in the closed state, the touch detection mode in the first detection period TP1 may be changed or may be performed in a partial region of the display region DA, as will be described later.

The first detection period TP1 is arranged between the first display period DP1 and the second display period DP2. The detection target such as the finger is detected in the first detection period TP1. To be specific, the display IC 50 supplies, to the drive electrodes Tx, a first detection drive signal VD1 having a frequency (non-resonant frequency) different from the resonant frequency of the LC circuit 35 in the input support device 3. The detection electrodes Rx output, to the detection IC 51, changes in the mutual electrostatic capacitances between the drive electrodes Tx and the detection electrodes Rx as detection signals Vdet1.

The detection IC 51 performs signal processing on the detection signals Vdet1 output from the detection electrodes Rx. The detection IC 51 calculates first frame data (Frame_data1) formed by a plurality of signal values based on the detection signals Vdet1 for one frame. The detection IC 51 can detect the presence or absence of the detection target such as the finger and positional information thereof by comparing the signal values on which the calculation processing has been performed and a predetermined threshold. Touch detection for one frame, that is, the overall detection region (display region DA) is performed in one first detection period TP1 when the cover 103 is in the open state. The period F indicated in FIG. 6 is a period within which rewriting for one frame, that is, the entire display region DA, is completed.

The second detection period TP2 is arranged between the second display period DP2 and the first display period DP1 in the subsequent frame period F. The detection target such as the input support device 3 and the finger is detected in the second detection period TP2. To be specific, the display IC 50 supplies, to the drive electrodes Tx, a second detection drive signal VD2 having the resonant frequency of the LC circuit 35 in the input support device 3. The detection electrodes Rx output detection signals Vdet2 based on changes in the mutual electrostatic capacitances between the drive electrodes Tx and the detection electrodes Rx. The detection electrodes Rx output the detection signals Vdet2 based on resonance of the LC circuit 35 in a region in which the input support device 3 is arranged.

The detection IC 51 performs signal processing on the detection signals Vdet2 output from the detection electrodes Rx. The detection IC 51 calculates second frame data (Frame_data2) formed by a plurality of signal values based on the detection signals Vdet2 for one frame. The detection IC 51 can detect information about a position and a rotation angle of the input support device 3 by comparing the signal values (second frame data) on which the calculation processing has been performed with the signal values (first frame data) on which the calculation processing has been performed likewise. The detection target such as the finger can be detected utilizing the second frame data used for the detection of the input support device 3 in the second detection period TP2. That is to say, the detection IC 51 can detect the position and the like of the input support device 3 and a finger Fg utilizing the changes in the mutual electrostatic capacitances and the resonance of the LC circuit 35 included in the input support device 3. The detection IC 51 can identify pieces of data of the finger Fg and the input support device 3 as different pieces of data based on the changes in the mutual electrostatic capacitances and the resonance of the LC circuit 35. Detection for one frame, that is, the overall detection region (display region DA) is performed in one second detection period TP2 when the cover 103 is in the open state. That is to say, a detection report rate TR of the detection target such as the finger Fg has the length of about half of the frame period F.

The timing waveform chart illustrated in FIG. 6 is merely an example and can be appropriately modified. For example, one display period DP may be continuously arranged in one frame period F. Alternatively, one of the first detection period TP1 and the second detection period TP2 may be arranged in one frame period F. When the first detection drive signal VD1 and the second detection drive signal VD2 need not to be distinguished from each other for explanation, they can be referred to as detection drive signals VD simply.

When the first detection period TP1 and the second detection period TP2 need not to be distinguished from each other for explanation, they can be referred to as detection periods TP simply.

Next, a method for detecting the input support device 3 in the second detection period TP2 will be described with reference to FIG. 5 and FIG. 7. FIG. 7 is a timing waveform chart for explaining the method for detecting the input support device.

Figure 7:
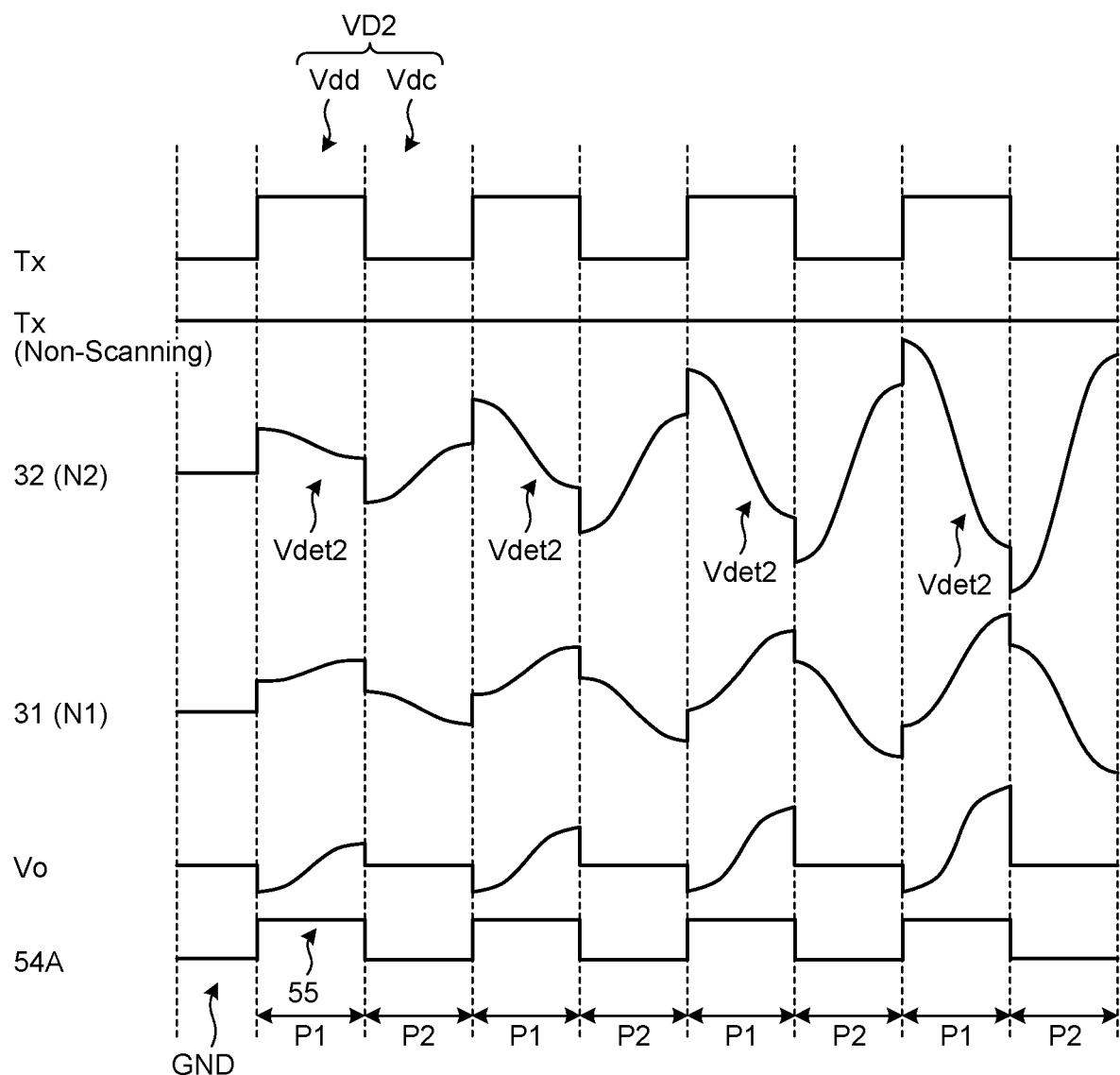
FIG. 7 is a timing waveform chart for explaining the method for detecting the input support device.

As illustrated in FIG. 5 and FIG. 7, the second detection drive signal VD2 of alternate rectangular waves is supplied to the other drive electrode Tx (the drive electrode Tx on the right side in FIG. 5) by an operation of the switch element 54B. To be more specific, the power supply potential Vdd at a high level potential and the reference potential Vdc at a low level potential are alternately applied repeatedly at a predetermined frequency with a switching operation of the switch element 54B, so that the second detection drive signal VD2 is formed and is supplied to the other drive electrode Tx. A potential V3 of the other drive electrode Tx varies in accordance with the second detection drive signal VD2.

Periods that are repeated in synchronization with the second detection drive signal VD2 are a first period P1 and a second period P2. The first period P1 is a period in which the other drive electrode Tx is coupled to the power supply potential Vdd (a period in which the switch element 54B couples the other drive electrode Tx and the power supply potential Vdd). The second period P2 is a period in which the other drive electrode Tx is coupled to the reference potential Vdc (a period in which the switch element 54B couples the other drive electrode Tx and the reference potential (ground potential)). The power supply potential Vdd is higher than the reference potential Vdc, for example. Although the second detection drive signal VD2 is formed by a combination of one-time input of the power supply potential Vdd and one-time input of the reference potential Vdc in FIG. 7, it is needless to say that the configuration in which they are repeated a plurality of number of times can also be regarded as the second detection drive signal VD2.

The detection electrode Rx outputs the detection signals Vdet2 based on the mutual electrostatic capacitance Cm. To be specific, one drive electrode Tx (the drive electrode Tx on the left side in FIG. 5) is coupled to the reference potential (for example, the reference potential Vdc) in both of the first period P1 and the second period P2, as described above. Signals at different potentials are thereby supplied to the first electrode 31 and the second electrode 32 in the first period P1. The detection electrode Rx is coupled to the detection circuit 55 with the switching operation of the switch element 54A in the first period P1. With this configuration, variation in a potential based on the mutual electrostatic capacitance Cm is output, as the detection signals Vdet2, to the detection circuit 55 from the detection electrode Rx. Coupling between the detection electrode Rx and the detection circuit 55 is interrupted with the switching operation of the switch element 54A in the second period P2. The detection electrode Rx is coupled to the reference potential Vdc with the switching operation of the switch element 54A in the second period P2.

The detection signal amplifier 61 of the detection circuit 55 amplifies the detection signals Vdet2 supplied from the detection electrode Rx. A reference voltage having a fixed potential is input to a non-inverting input portion of the detection signal amplifier 61, and the detection electrode Rx is coupled to an inverting input terminal. A signal (for example, the reference potential Vdc) that is the same as that to one drive electrode Tx is input as the reference voltage in the present embodiment. The detection circuit 55 can reset charges of the capacitive element 62 by turning the reset switch 63 ON.

The second detection drive signal VD2 has the same frequency as the resonant frequency of the LC circuit 35. In the present embodiment, for example, the switching operation of the switch element 54B is performed based on the resonant frequency to form the second detection drive signal VD2 having the resonant frequency. The second electrode 32 overlapping with the other drive electrode Tx is also driven at the resonant frequency, so that resonance of the LC circuit 35 is generated. With this configuration, the amplitudes of the detection signals Vdet2 are thereby increased as the first period P1 and the second period P2 are repeated in the detection period. As illustrated in FIG. 7, the amplitudes of the detection signals Vdet2 are increased and the potential of the output signal Vo from the detection circuit 55 varies to be increased as the first period P1 is repeated a plurality of number of times.

With the resonance of the LC circuit 35, the waveform that is generated in the first electrode 31 varies from the waveform that is generated in the second electrode 32 such that the polarities of the first electrode 31 and the second electrode 32 are changed so as to invert from each other. The potential of the first electrode 31 varies to be increased and the second electrode 32 varies to be decreased in each first period P1, for example. The potential of the first electrode 31 varies to be decreased and the potential of the second electrode 32 varies to be increased in each second period P2. The detection IC 51 may detect various pieces of information of the input support device 3 based on the signal values of the detection signals Vdet2 having different polarities.

Figure 8:
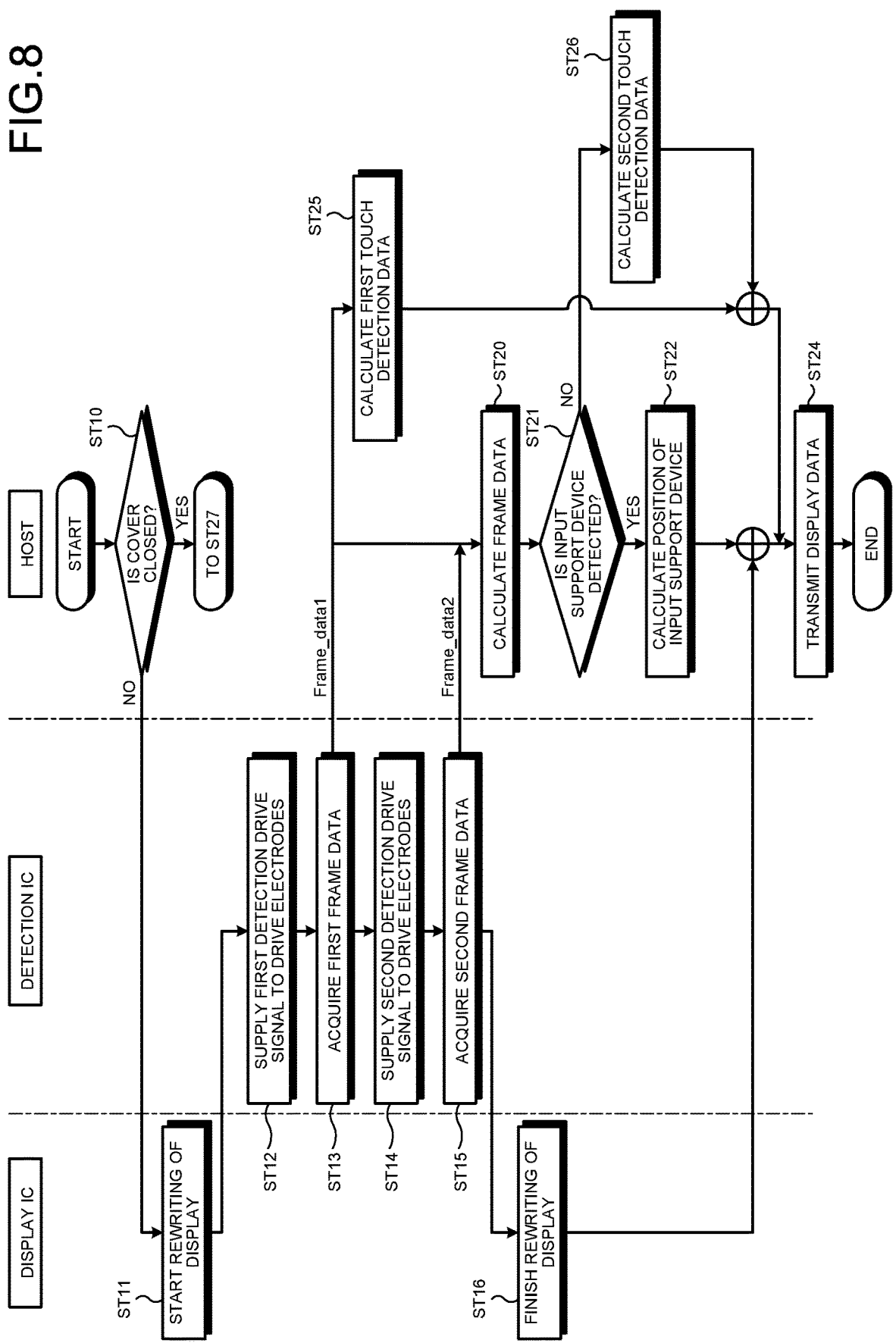
FIG. 8 is a flowchart for explaining operations of the input detection system when the cover is in the open state.

Next, switching of an operation flow of the input detection system 1 corresponding to the open or closed state of the cover 103 of the electronic apparatus case 100 will be explained with reference to FIG. 8 and FIG. 9. FIG. 8 is a flowchart for explaining operations of the input detection system when the cover is in the open state.

As illustrated in FIG. 8, the host 53 receives information of detection of the input support device 3 in a previous frame from the detection IC 51 and determines whether the cover 103 is in the closed state (step ST10). When the cover 103 is in the open state (No at step ST10), the host 53 outputs a control signal to the display IC 50, and the display IC 50 starts rewriting of display in the display region DA (step ST11). An operation flow when the cover 103 is in the closed state (Yes at step ST10) will be described later with reference to FIG. 9.

At step ST11, the images for one frame may be divided into a plurality of periods (the first display period DP1 and the second display period DP2) for display as illustrated in FIG. 6 or may be displayed in one display period. For example, the display IC 50 rewrites display for the first display period DP1 between step ST11 and step ST12, which will be described later, and rewrites display for the second display period DP2 between step ST12 and step ST14.

Then, the display IC 50 supplies the first detection drive signal VD1 to the drive electrodes Tx in order in the first detection period TP1 (refer to FIG. 6) (step ST12). The first detection drive signal VD1 has the frequency (non-resonant frequency) different from the resonant frequency of the LC circuit 35 as described above.

The detection IC 51 performs the above-mentioned signal processing with the detection circuit 55 based on the detection signals Vdet1 for one frame. The detection IC 51 acquires the first frame data based on the signal values of the output signal Vo for one frame that have been provided by the signal processing (step ST13). The detection IC 51 transmits the first frame data to the host 53.

The host 53 calculates first touch detection data as difference data between the first frame data and previously acquired baseline data (step ST25). The host 53 calculates, based on the first touch detection data, the presence or absence of the finger that is in contact with or proximity to the display region DA and the touch coordinates of the finger.

Thereafter, the display IC 50 supplies the second detection drive signal VD2 to the drive electrodes Tx in the second detection period TP2 (refer to FIG. 6) (step ST14). The second detection drive signal VD2 has the resonance frequency of the LC circuit 35 as described above.

The detection IC 51 performs the above-mentioned signal processing with the detection circuit 55 based on the detection signals Vdet2 for one frame. The detection IC 51 acquires the second frame data based on the signal values of the output signal Vo for one frame that have been provided by the signal processing in the detection circuit 55 (step ST15). The detection IC 51 transmits the second frame data to the host 53. When the second detection period TP2 (refer to FIG. 6) ends, the display IC 50 finishes the rewriting of display for one frame period F (step ST16). That is to say, the first display period DP1, the first detection period TP1, the second display period DP2, and the second detection period TP2 illustrated in FIG. 6 are implemented in this order from step ST11 to step ST16. Control may be performed in such a manner that after the display of the entire display region DA is rewritten in one display period in one frame period F, the first detection period TP1 and the second detection period TP2 may be successively implemented.

The host 53 calculates the difference (Frame_data2−Frame_data1) between the first frame data and the second frame data (step ST20). After that, the host 53 compares the difference data provided at step ST20 with a previously set threshold to determine whether the input support device 3 is detected (step ST21).

When the difference data provided at step ST20 is equal to or higher than the threshold, the host 53 determines that the input support device 3 is detected (Yes at step ST21). This means a state where although the cover 103 has been in the open state in the beginning (that is, at step ST10), the cover 103 is closed till step ST20 and the input support device 3 therefore overlaps with the display region DA. As described above, in the present embodiment, the host 53 acquires the second frame data even when the cover 103 is in the open state and detects the presence or absence of the input support device 3 on the display region DA, that is, the opening or closing of the cover 103 by comparing the first frame data with the second frame data. The host 53 performs the signal processing on the second frame data to calculate information such as the position and the rotation angle of the input support device 3 (step ST22).

When the difference data provided at step ST20 is lower than the threshold, the host 53 determines that the input support device 3 is not detected (No at step ST21). This means a state where although the cover 103 has been in the open state in the beginning (that is, at step ST10), the cover 103 is still in the open state even when reaching step ST20 and the input support device 3 does not therefore overlap with the display region DA. The host 53 calculates second touch detection data as difference data between the second frame data and the previously acquired baseline data or the first frame data (step ST26). The host 53 calculates the presence or absence of the finger in contact with or proximity to the display region DA and the touch coordinates of the finger in contact with or proximity to it based on the second touch detection data.

The host 53 transmits, to the display IC 50, display data in accordance with the information such as the position and the rotation angle of the input support device 3 that has been provided at steps ST20, ST21, and ST22 or the information about the touch detection of the finger or the like that has been provided at steps ST25 and ST26 (step ST24). The display IC 50 executes display for the subsequent frame period F based on the display data received from the host 53 (the process returns from end to start again).

Figure 9:
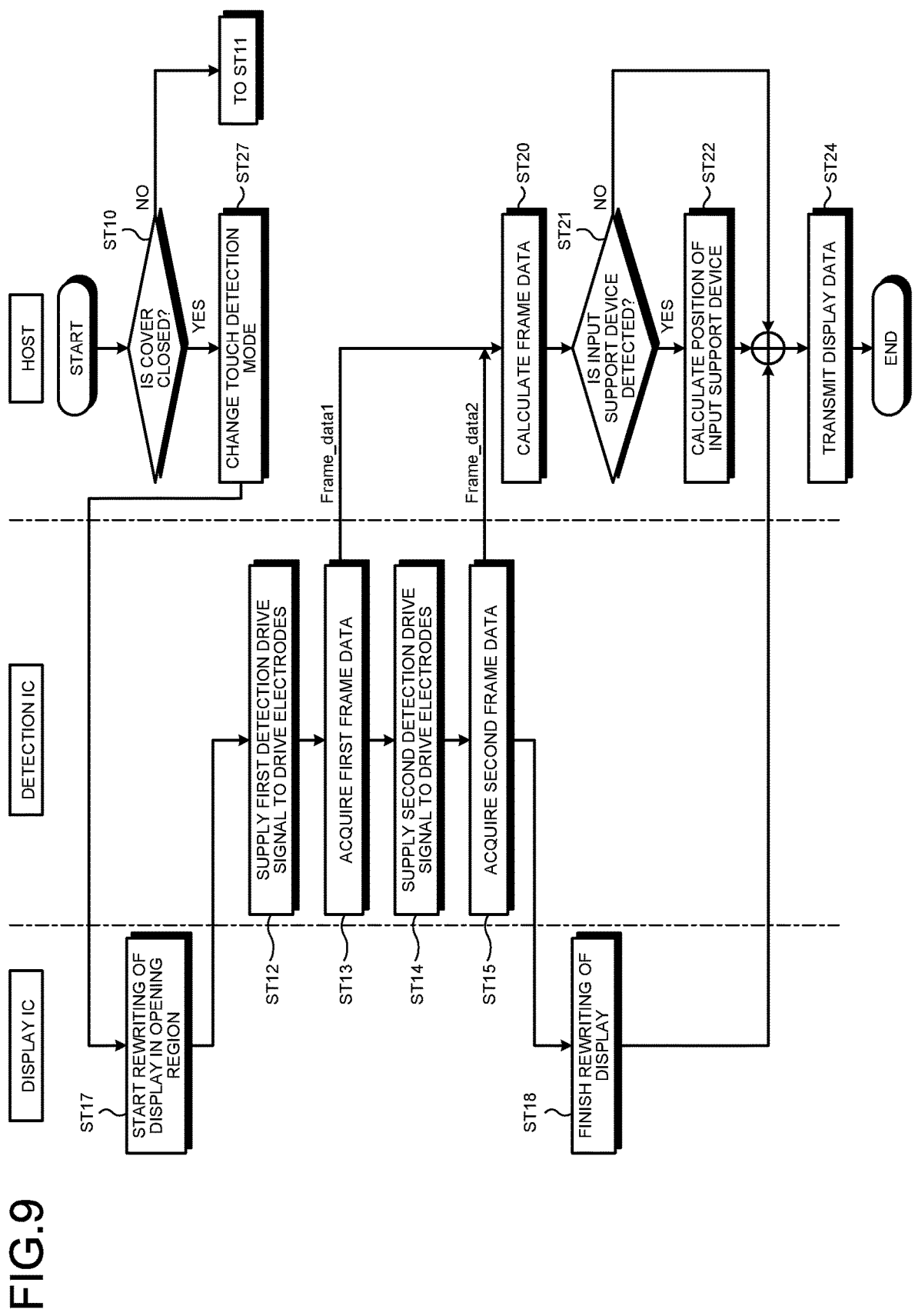
FIG. 9 is a flowchart for explaining operations of the input detection system when the cover is in the closed state.

FIG. 9 is a flowchart for explaining operations of the input detection system when the cover is in the closed state. As illustrated in FIG. 9, when the cover 103 is in the closed state (Yes at step ST10), the host 53 changes the touch detection mode (step ST27). To be specific, the input detection system 1 detects the input support device 3 when the cover 103 is in the closed state and stops touch detection of the finger or the like different from the input support device 3. The following explains the detail.

The host 53 outputs a control signal to the display IC 50, and the display IC 50 starts rewriting of display in the opening region DAs of the display region DA (step ST17). In this case, the gate drive circuit 59 (refer to FIG. 4) scans in order the scan lines GL in the entire display region DA including the opening region DAs. Since the display region DA excluding the opening region DAs is covered by the light non-transmitting cover 103, the display IC 50 performs normal display in the opening region DAs and performs display in a low-power consumption mode (for example, black display) in the display region DA excluding the opening region DAs.

Thereafter, the display IC 50 and the detection IC 51 perform detection similarly to that at step ST12 to step ST15 described above and transmit the first frame data and the second frame data to the host 53.

Similarly to the operation flow when the cover 103 is in the open state, the host 53 calculates the difference (Frame_data2−Frame_data1) between the first frame data and the second frame data (step ST20). Since the input support device 3 is mounted on the cover 103, an overlapping position of the input support device 3 in the display region DA is specified at a predetermined position. In view of this point, the host 53 can be configured to acquire and calculate the first frame data and the second frame data only for the predetermined position and its periphery. It is needless to say that the first frame data and the second frame data can be acquired for the entire display region DA regardless of the presence or absence of the input support device 3. After that, the host 53 compares the difference data provided at step ST20 with the previously set threshold to determine whether the input support device 3 is detected (step ST21).

When the difference data provided at step ST20 is equal to or higher than the threshold, the host 53 determines that the input support device 3 is detected (Yes at step ST21). This means a state where although the cover 103 has been in the closed state in the beginning (that is, at step ST10), the cover 103 is still in the closed state even when reaching step ST20 and the input support device 3 therefore overlaps with the display region DA. In this case, the host 53 performs signal processing on the second frame data to calculate information such as the rotation angle of the input support device 3 (step ST22) and transmits display data in accordance with the operation of the input support device 3 to the display IC 50 (step ST24). The host 53 can omit calculation of the position of the input support device 3 after steps ST20 and ST21 because the position of the input support device 3 mounted on the cover 103 (position on the display region DA) is known.

When the difference data provided at step ST20 is lower than the threshold, the host 53 determines that the input support device 3 is not detected (No at step ST21). In this case, the input support device 3 is separated from the cover member 111, that is, the cover 103 with the input support device 3 is in the open state, and no calculation of the position, orientation, and the like of the input support device 3 is performed. The display data is transmitted to the display IC 50, and then, the process shifts to control for the subsequent frame (returns from end to start again).

The operation flows illustrated in FIG. 8 and FIG. 9 are merely examples and can be appropriately modified. For example, the detection IC 51 may execute a part of the frame data calculation processing (steps ST20, ST22, ST25, ST26, and the like). The calculation processing of the second touch detection data (step ST26) illustrated in FIG. 8 may be omitted.

As explained above, the input detection system 1 in the present embodiment includes the display device with the detection function (display device 2) that includes the detection electrodes Rx aligned in the display region DA, the electronic apparatus case 100 including the accommodation portion (the base 101 and the fixing portion 105) accommodating therein the display device with the detection function and the cover 103 covering the display region DA of the display device with the detection function, and the input support device 3 that is mounted on the cover 103 of the electronic apparatus case 100 and includes the first electrode 31 and the second electrode 32 facing the detection electrodes Rx.

With this configuration, in the input detection system 1, when the cover 103 is in the closed state, the input support device 3 is arranged in the region overlapping with the display region DA of the display device 2, and the first electrode 31 and the second electrode 32 face the detection electrodes Rx. The input detection system 1 can thereby detect the input support device 3 even when the cover 103 is in the closed state. Accordingly, the operator can perform input operations with the input support device 3 when the cover 103 of the electronic apparatus case 100 is in the closed state.

Second Embodiment

Figure 10:
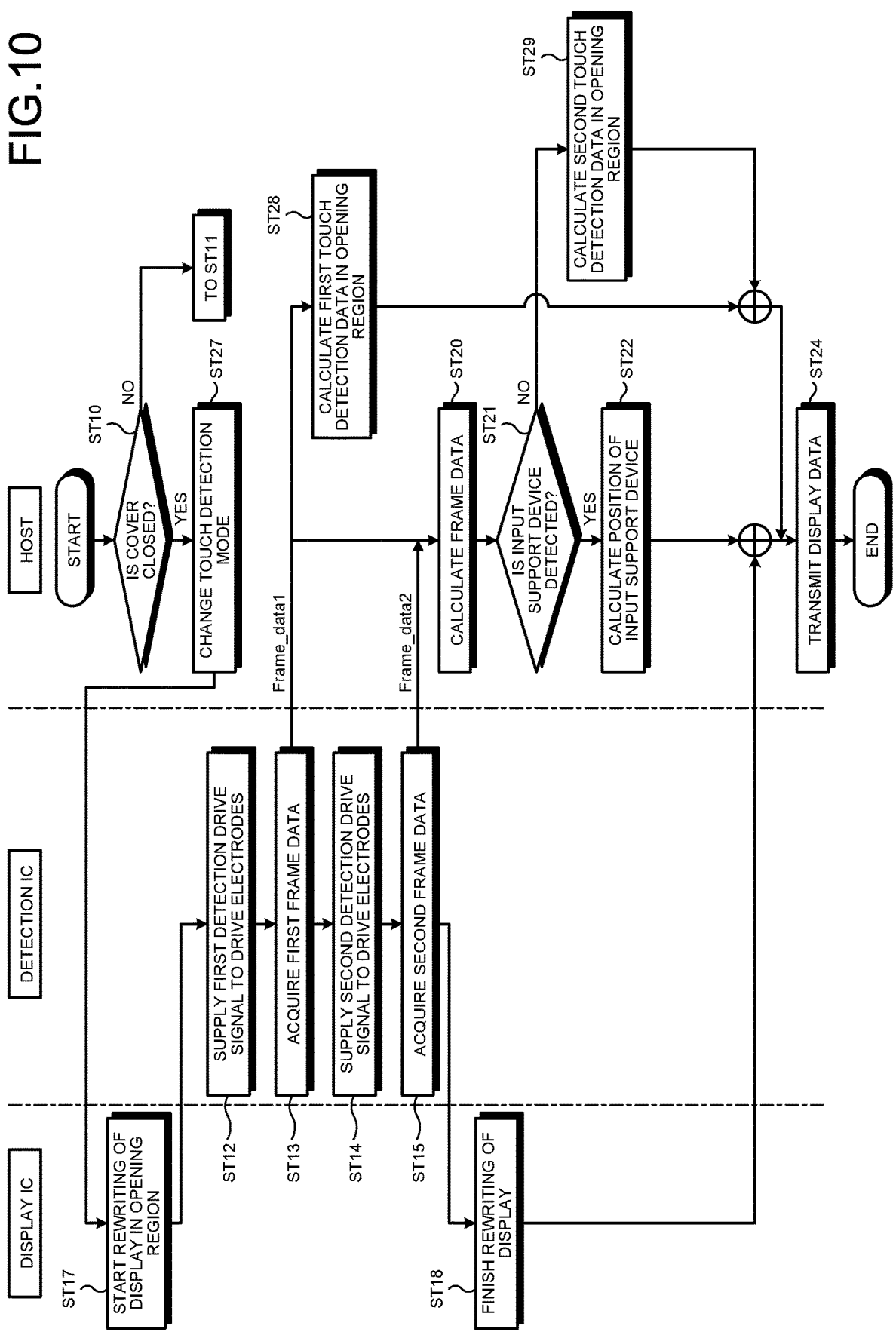
FIG. 10 is a flowchart for explaining operations when a cover is in a closed state in an input detection system according to a second embodiment.

FIG. 10 is a flowchart for explaining operations when the cover 103 is in a closed state in an input detection system according to a second embodiment. In the following explanation, the same reference numerals denote the same components described in the above-mentioned embodiment and repeated explanation thereof is omitted.

The above-mentioned first embodiment has described the operation flow where the touch detection is stopped when the cover 103 is in the closed state. The operation flow is however not limited thereto. As illustrated in FIG. 10, the host 53 changes a touch detection mode (step ST27) and executes touch detection of a detection target such as a finger different from the input support device 3 in the opening region DAs of the display region DA.

The host 53 calculates first touch detection data in the opening region DAs based on the first frame data received from the detection IC 51 (step ST28). The host 53 calculates the presence or absence of the finger in contact with or proximity to the opening region DAs of the display region DA, that is, the display opening OP1 of the cover 103 and the touch coordinates of the finger in contact with or proximity to it in the opening region DAs based on the first touch detection data.

The host 53 calculates second touch detection data in the opening region DAs based on the second frame data received from the detection IC 51 (step ST29). The host 53 calculates the presence or absence of the finger in contact with or proximity to the opening region DAs of the display region DA, that is, the display opening OP1 of the cover 103 and the touch coordinates of the finger in contact with or proximity to it in the opening region DAs based on the second touch detection data.

The display device 2 in the present embodiment can thus perform touch detection in the display opening OP1 of the cover 103 even when the cover 103 is in the closed state. In the present embodiment as well, the acquisition positions of the first frame data and the second frame data can be limited. More specifically, the acquisition positions of these pieces of frame data can be limited to a predetermined position where the opening region DAs and the input support device 3 overlap with each other. It is needless to say that these pieces of frame data in the entire display region DA can be acquired.

Third Embodiment

Figure 11:
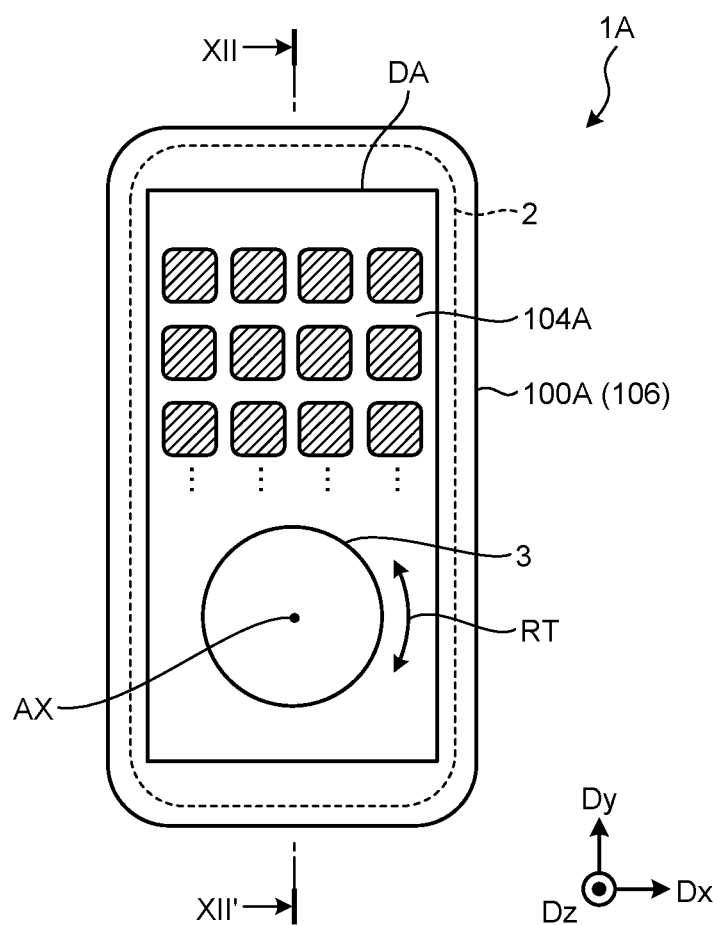
FIG. 11 is a plan view schematically illustrating an input detection system according to a third embodiment.
Figure 12:
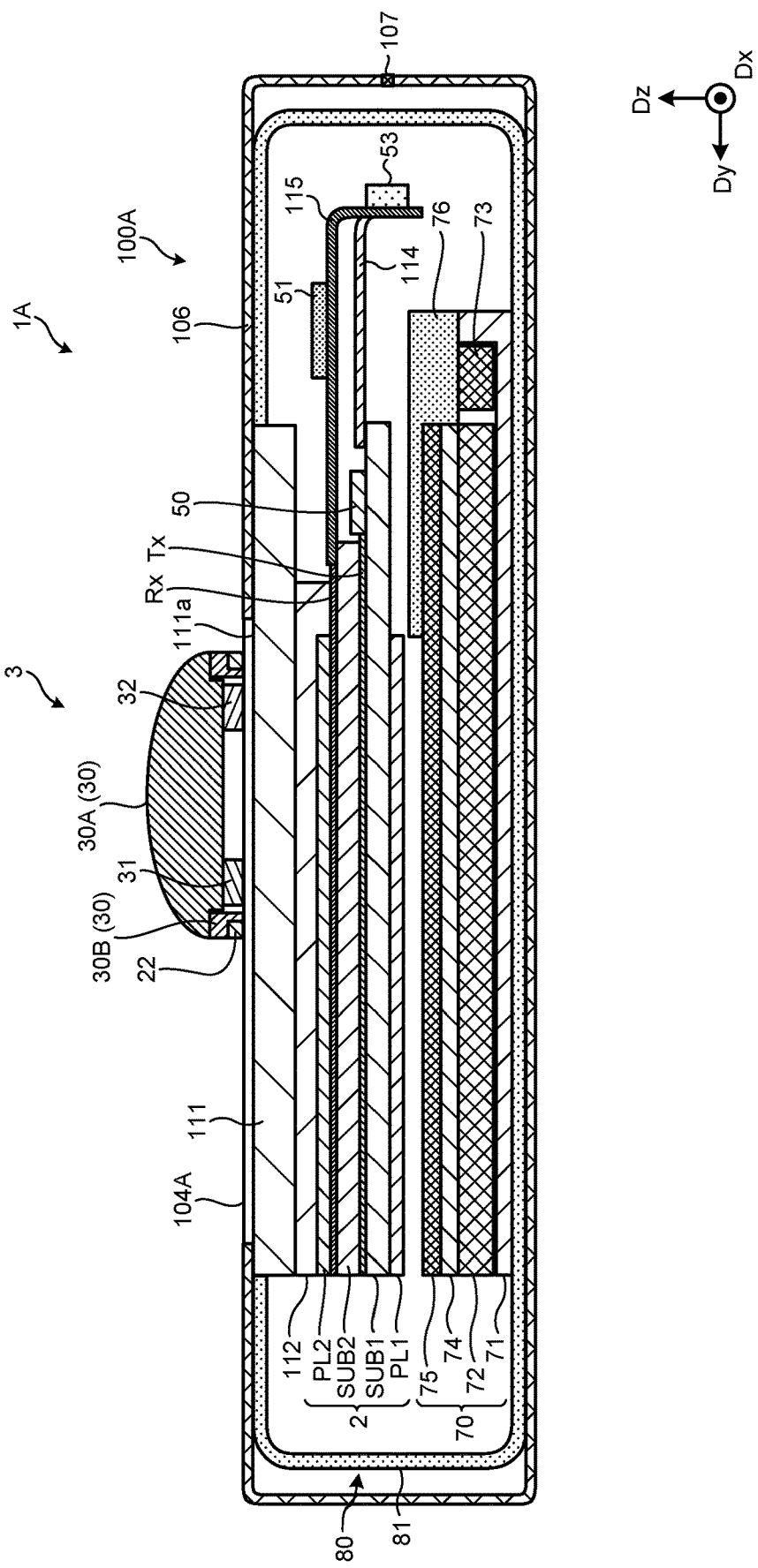
FIG. 12 is a cross-sectional view cut along line XII-XII' in FIG. 11.

FIG. 11 is a plan view schematically illustrating an input detection system according to a third embodiment. FIG. 12 is a cross-sectional view cut along line XII-XII' in FIG. 11. In the above-mentioned first and second embodiments, the notebook-type case or the flip cover with the cover 103 that can be opened and closed is employed as the electronic apparatus case 100, but this is not construed in a limiting sense.

As illustrated in FIGS. 11 and 12, an input detection system 1A in the third embodiment includes an electronic apparatus case 100A that covers the surrounding of the display device 2. The electronic apparatus case 100A is a waterproof cover having water tightness and prevents water from entering the display device 2 arranged in the electronic apparatus case 100A.

The electronic apparatus case 100A includes an accommodation portion 106 that accommodates therein the display device 2, the backlight 70, and the cover member 111 and a protective film 104A that covers the display region DA. The accommodation portion 106 can be opened and closed, for example, by an opening and closing portion 107 such as a zipper. An opening is provided in a region of the accommodation portion 106 that overlaps with the display region DA. The protective film 104A is made of a light transmitting resin material and is provided so as to cover the opening of the accommodation portion 106. In other words, the protective film 104A covers the entire display region DA of the display device 2 in a state where the display device 2 is accommodated in the electronic apparatus case 100A. An operator can view the display region DA through the protective film 104A. In other words, the protective film 104A serves as the cover 103 in the above-mentioned first and second embodiments.

The input support device 3 is rotatably mounted on the protective film 104A with the adhesive layer 22. A portion of the protective film 104A on which the input support device 3 is mounted is made of a material having preferable adhesion to the cover member 111. For example, nylon, silicon sheet, or the like is used as the material for the protective film 104A. The protective film 104A may however be made of another material such as glass or acrylic.

In the input detection system 1A, the protective film 104A covers the display region DA. Detection accuracy of touch detection is therefore lowered compared to the case without the electronic apparatus case 100A. Even in this case, input operations with the input support device 3 can be performed even in the state where the display device 2 is accommodated in the electronic apparatus case 100A and the protective film 104A covers the display region DA (when the cover is in the closed state) because the input support device 3 is provided on the protective film 104A (cover). The present embodiment is not limited to the configuration in which the position of the input support device 3 is fixed on the protective film 104A. The input support device 3 may be detachably provided, and the operator can mount the input support device 3 at any position on the protective film 104A to perform the input operations with the input support device 3.

Figure 13:
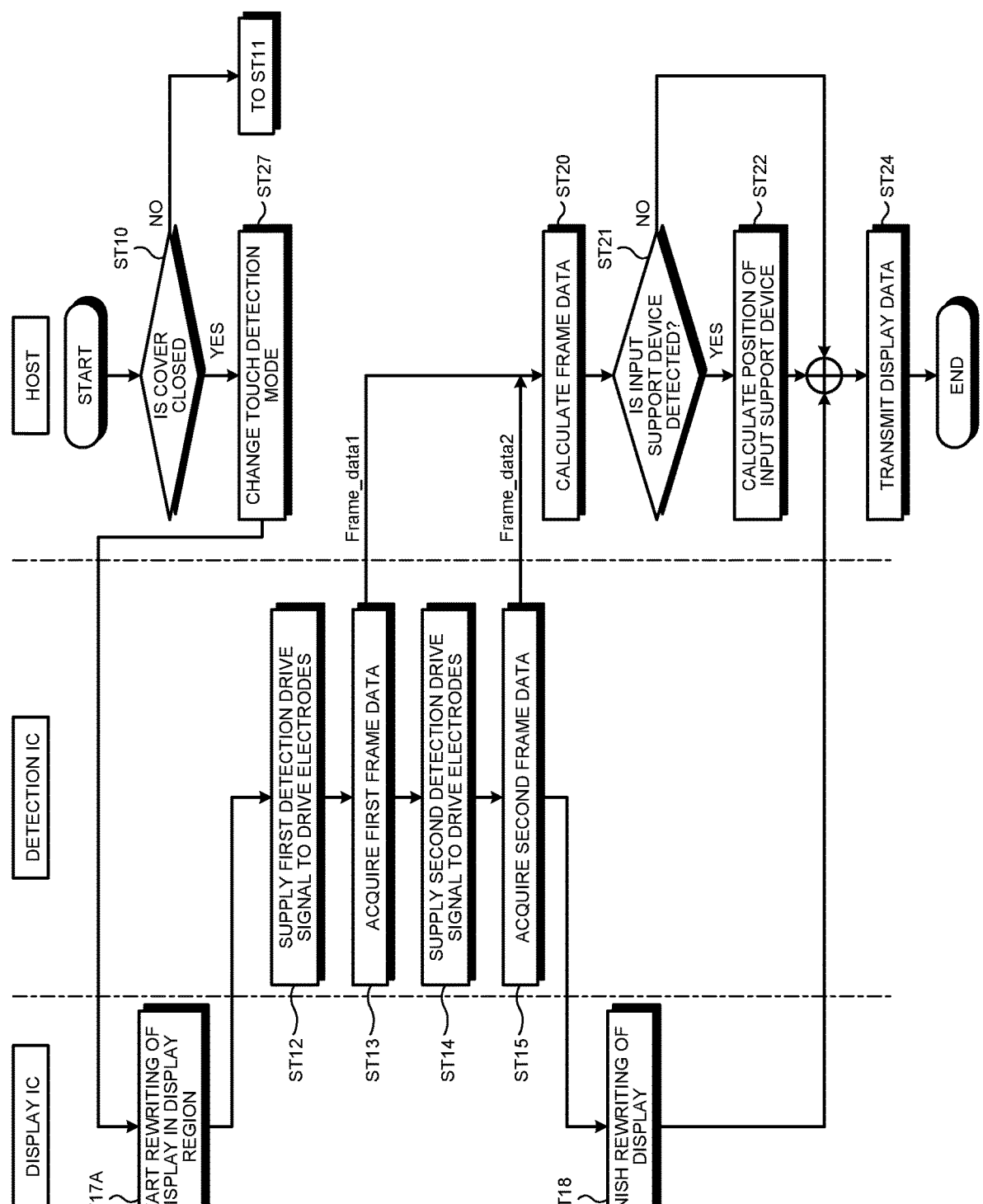
FIG. 13 is a flowchart for explaining operations when a cover is in a closed state in the input detection system in the third embodiment.

FIG. 13 is a flowchart for explaining operations when the cover is in the closed state in the input detection system in the third embodiment. As illustrated in FIG. 13, when the cover is in the closed state (Yes at step ST10), the host 53 changes a touch detection mode (step ST27). Specifically, the input detection system 1A detects the input support device 3 and stops touch detection of the detection target such as the finger different from the input support device 3 similarly to the above-mentioned first embodiment.

The display IC 50 starts rewriting of display of the entire display region DA even when the cover is in the closed state (step ST17A) because the electronic apparatus case 100A enables the operator to view the entire display region DA except for a region where the input support device 3 overlaps. The detection flow of the input support device 3 from step ST12 to step ST15 and steps ST20 and ST21 is similar to that in the above-mentioned first embodiment, and repeated explanation is omitted.

Fourth Embodiment

Figure 14:
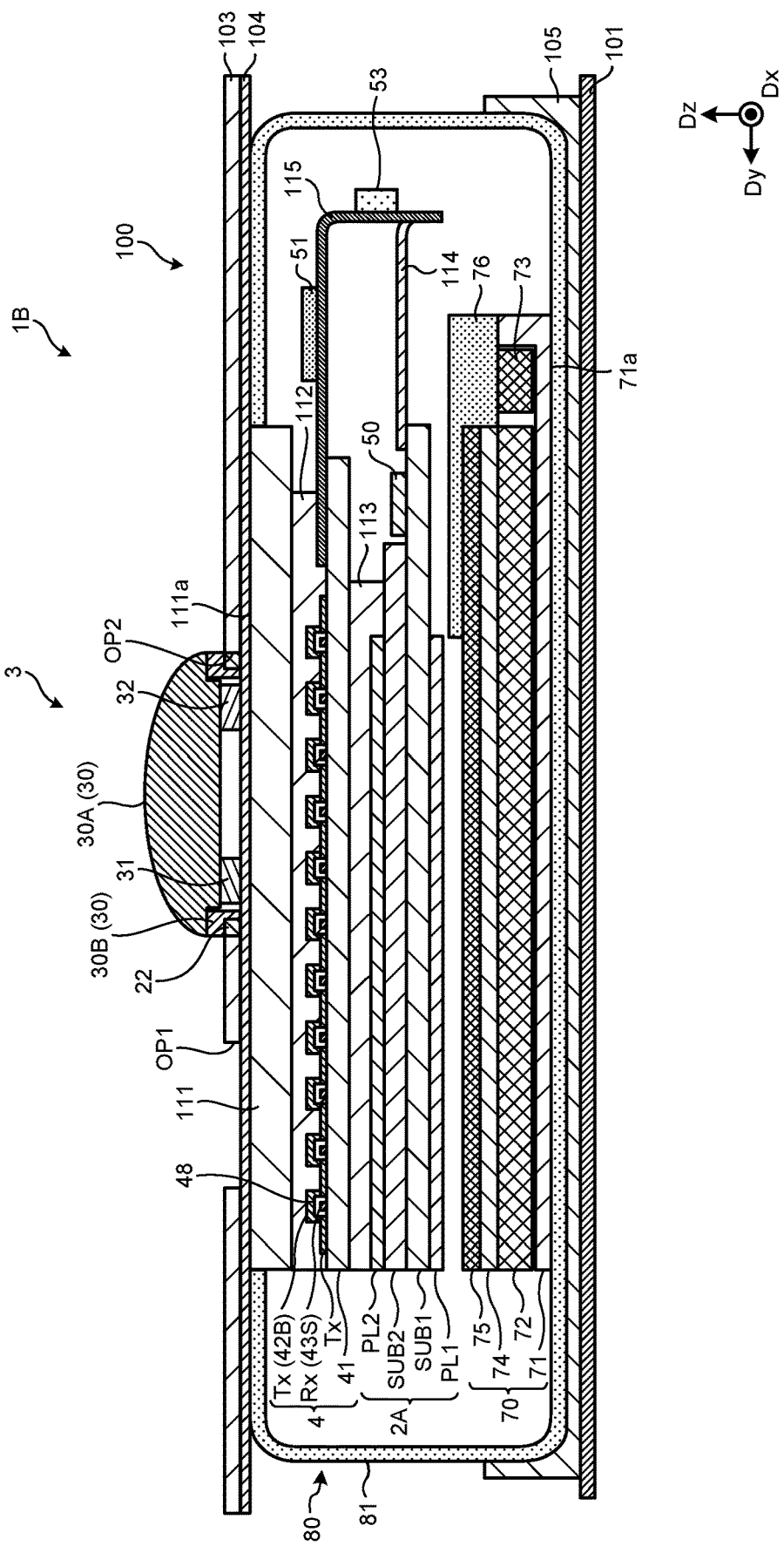
FIG. 14 is a cross-sectional view illustrating a schematic cross-sectional structure of an input detection system according to a fourth embodiment.

FIG. 14 is a cross-sectional view illustrating a schematic cross-sectional structure of an input detection system according to a fourth embodiment. As illustrated in FIG. 14, an input detection system 1B in the fourth embodiment includes a display device 2A and a detection device 4. The detection device 4 is a so-called touch panel provided on the display device 2A. The detection device 4 is a mutual electrostatic capacitance-type touch panel including the drive electrodes Tx and the detection electrodes Rx. The detection device 4 is however not limited thereto, and the detection device 4 may be a self-electrostatic capacitance-type touch panel with a plurality of detection electrodes arrayed in a matrix with a row-column configuration.

The detection device 4 is bonded onto the display device 2A through an adhesive layer 113. The detection device 4 includes a substrate 41, the drive electrodes Tx, the detection electrodes Rx, and an insulating film 48. FIG. 14 illustrates parts (coupling portions 43S) of the detection electrodes Rx. The drive electrodes Tx and the detection electrodes Rx are provided on the substrate 41. Bridge portions 42B of the drive electrodes Tx and the coupling portions 43S of the detection electrodes Rx are insulated from each other by the insulating film 48. Mutual electrostatic capacitances are formed between the drive electrodes Tx and the detection electrodes Rx.

The wiring substrate 115 is coupled to the substrate 41. The wiring substrate 115 is configured by a flexible wiring substrate, for example. The detection IC 51 is mounted on the wiring substrate 115.

The cover member 111 is bonded onto the detection device 4 through the adhesive layer 112. For example, a glass substrate or a resin substrate is used for the cover member 111.

Figure 15:
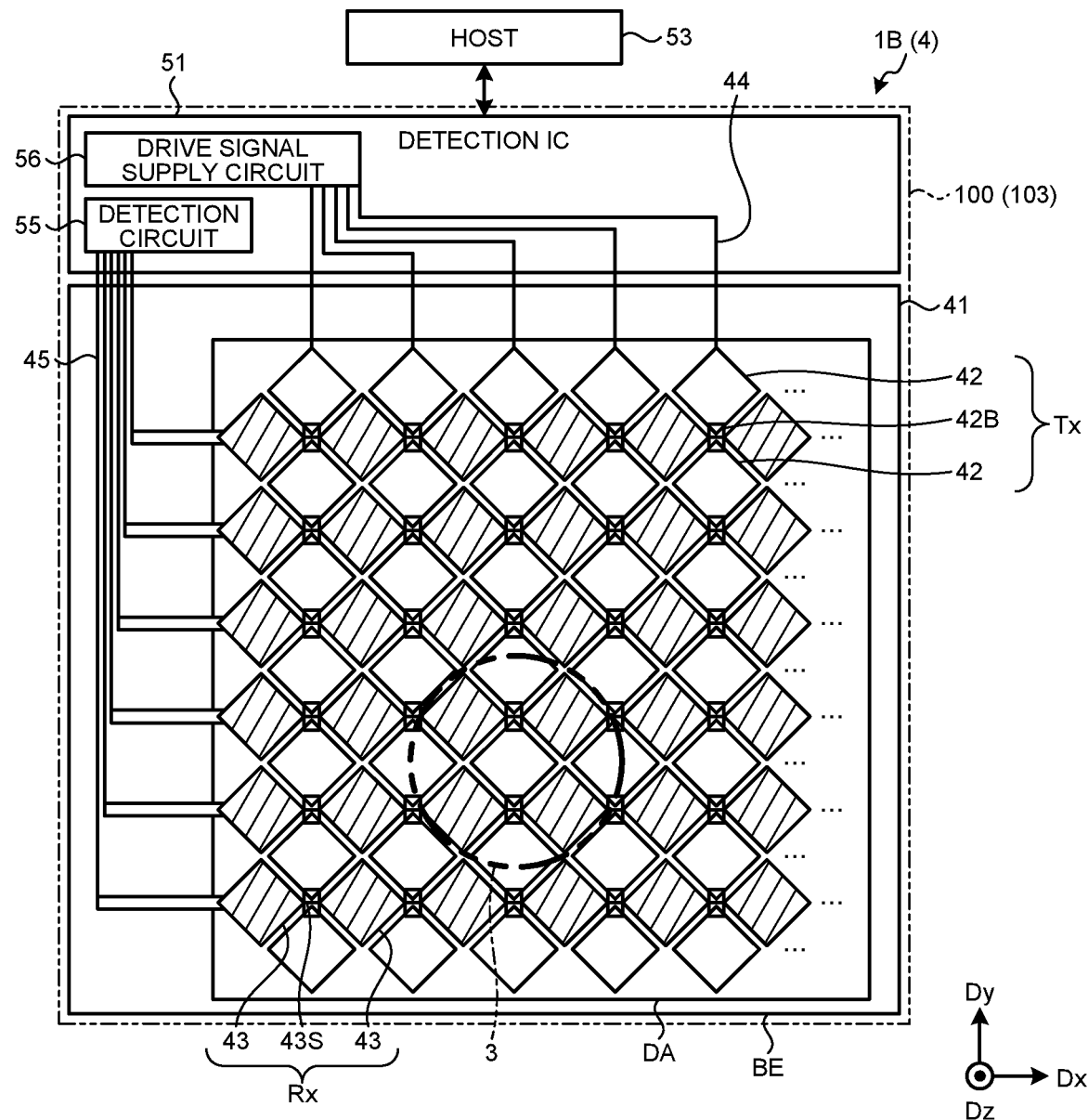
FIG. 15 is a block diagram illustrating an example of the configuration of the input detection system in the fourth embodiment.

FIG. 15 is a block diagram illustrating an example of the configuration of the input detection system in the fourth embodiment. In FIG. 15, electrode portions 43 of the detection electrodes Rx are hatched in order to make the drawing easy to view. As illustrated in FIG. 15, the drive electrodes Tx and the detection electrodes Rx are provided in a detection region (a region overlapping with the display region DA) of the substrate 41. The drive electrodes Tx and the detection electrodes Rx are made of, for example, a conductive material having a light transmitting property, such as indium tin oxide (ITO) and indium zinc oxide (IZO).

The drive electrodes Tx include a plurality of electrode portions 42 and the bridge portions 42B. In one drive electrode Tx, the electrode portions 42 are aligned in the second direction Dy. The bridge portions 42B couple the electrode portions 42 adjacent to each other in the second direction Dy. One drive electrode Tx thereby extends in the second direction Dy. The drive electrodes Tx are aligned in the first direction Dx. Each of the drive electrodes Tx is coupled to the detection IC 51 through a coupling wiring line 44.

The detection electrodes Rx include the electrode portions 43 and the coupling portions 43S. In one detection electrode Rx, the electrode portions 43 are aligned in the first direction Dx. The coupling portions 43S couple the electrode portions 43 adjacent to each other in the first direction Dx. One detection electrode Rx thereby extends in the first direction Dx. The detection electrodes Rx are aligned in the second direction Dy. Each of the detection electrodes Rx is coupled to the detection IC 51 through a coupling wiring line 45. In the present embodiment, the electrode portions 43 of the detection electrodes Rx are provided in the same layer as the electrode portions 42 of the drive electrodes Tx. The bridge portions 42B are provided in a different layer from the coupling portions 43S through the insulating film 48 (refer to FIG. 14) and intersect with the coupling portions 43S in a plan view.

The detection IC 51 includes the detection circuit 55 and the drive signal supply circuit 56. The drive signal supply circuit 56 supplies the detection drive signal VD to each of the drive electrodes Tx. The detection electrodes Rx output the detection signals Vdet based on changes in the mutual electrostatic capacitances Cm when the detection drive signal VD is supplied thereto. The detection circuit 55 can detect the detection target based on the detection signals Vdet that are output in accordance with the changes in the mutual electrostatic capacitances Cm between the drive electrodes Tx and the detection electrodes Rx.

A similar operation flow to that described in the above-mentioned first to third embodiments can be applied to detection of the input support device 3 and touch detection for detecting the finger or the like. The electrode portions 42 of the drive electrodes Tx and the electrode portions 43 of the detection electrodes Rx are square (rhombic). The shapes thereof are however not limited thereto, and the electrode portions 42 and 43 may have other shapes such as polygonal shapes and circular shapes.

Fifth Embodiment

Figure 16:
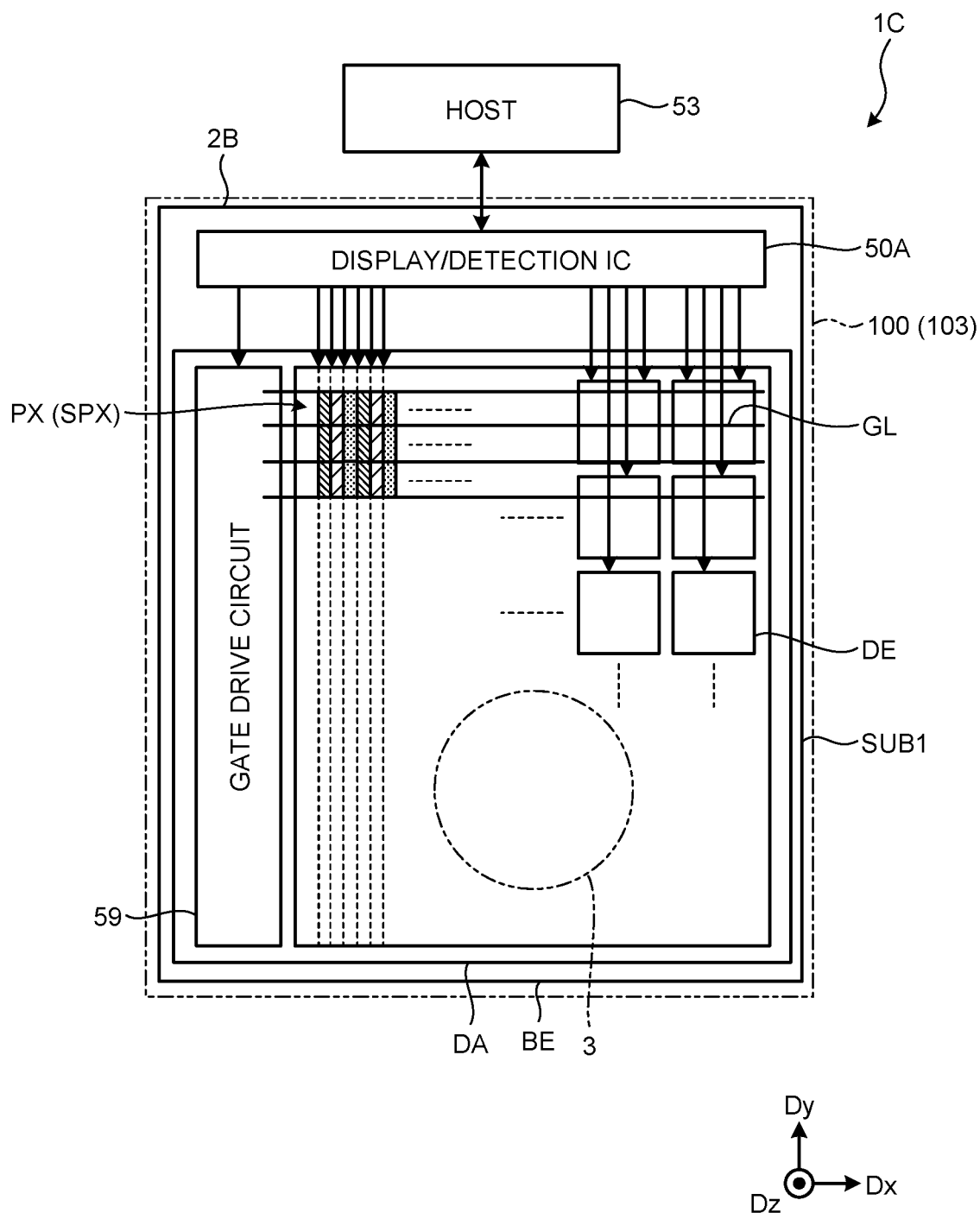
FIG. 16 is a block diagram illustrating an example of the configuration of an input detection system according to a fifth embodiment.

FIG. 16 is a block diagram illustrating an example of the configuration of an input detection system according to a fifth embodiment. The above-mentioned first to fourth embodiments have described the example in which the input support device 3 is arranged above the display device 2 or the detection device 4 that includes the mutual electrostatic capacitance-type touch sensor with the drive electrodes Tx and the detection electrodes Rx, but this is not construed in a limiting sense. The touch sensor (the display device 2 or the detection device 4) may be of the self-electrostatic capacitance-type (self-type).

In an input detection system 1C in the fifth embodiment, as illustrated in FIG. 16, a display device 2B includes a plurality of detection electrodes DE provided above the array substrate SUB1. The detection electrodes DE are arrayed in a matrix with a row-column configuration in the display region DA.

The detection electrodes DE serve as common electrodes in display and the drive electrodes Tx and as the detection electrodes Rx for detecting a detection target such as the input support device 3 and a finger. A display/detection IC 50A is provided in the peripheral region BE. The display/detection IC50A is a circuit having functions of the display IC50 and the detection IC51 and formed as a single IC.

The display/detection IC 50A supplies the display drive signal VCOM (refer to FIG. 6) to the detection electrodes DE in display. In detection of the detection target such as the input support device 3 and the finger Fg, the display/detection IC 50A supplies the detection drive signal VD to the detection electrodes DE through wiring lines. The display/detection IC 50A outputs detection signals Vdet to the host 53 based on changes in self-electrostatic capacitances of the detection electrodes DE and resonance of the LC circuit 35. The host 53 detects the detection target such as the input support device 3 and the finger Fg by performing signal processing on first frame data and second frame data similarly to the operation flow in the first embodiment or the second embodiment described above.

In the self-electrostatic capacitance-type touch detection, the display device 2B can detect the finger Fg or the like by supplying the detection drive signal VD to all the detection electrodes DE. On the other hand, in the detection of the input support device 3, the detection drive signal VD is supplied to the detection electrodes DE in order so as to generate resonance of the LC circuit 35. An operation flow similar to that described in any one of the above-mentioned first to third embodiments can also be applied to the input detection system 1C in the fifth embodiment.

Sixth Embodiment

Figure 17:
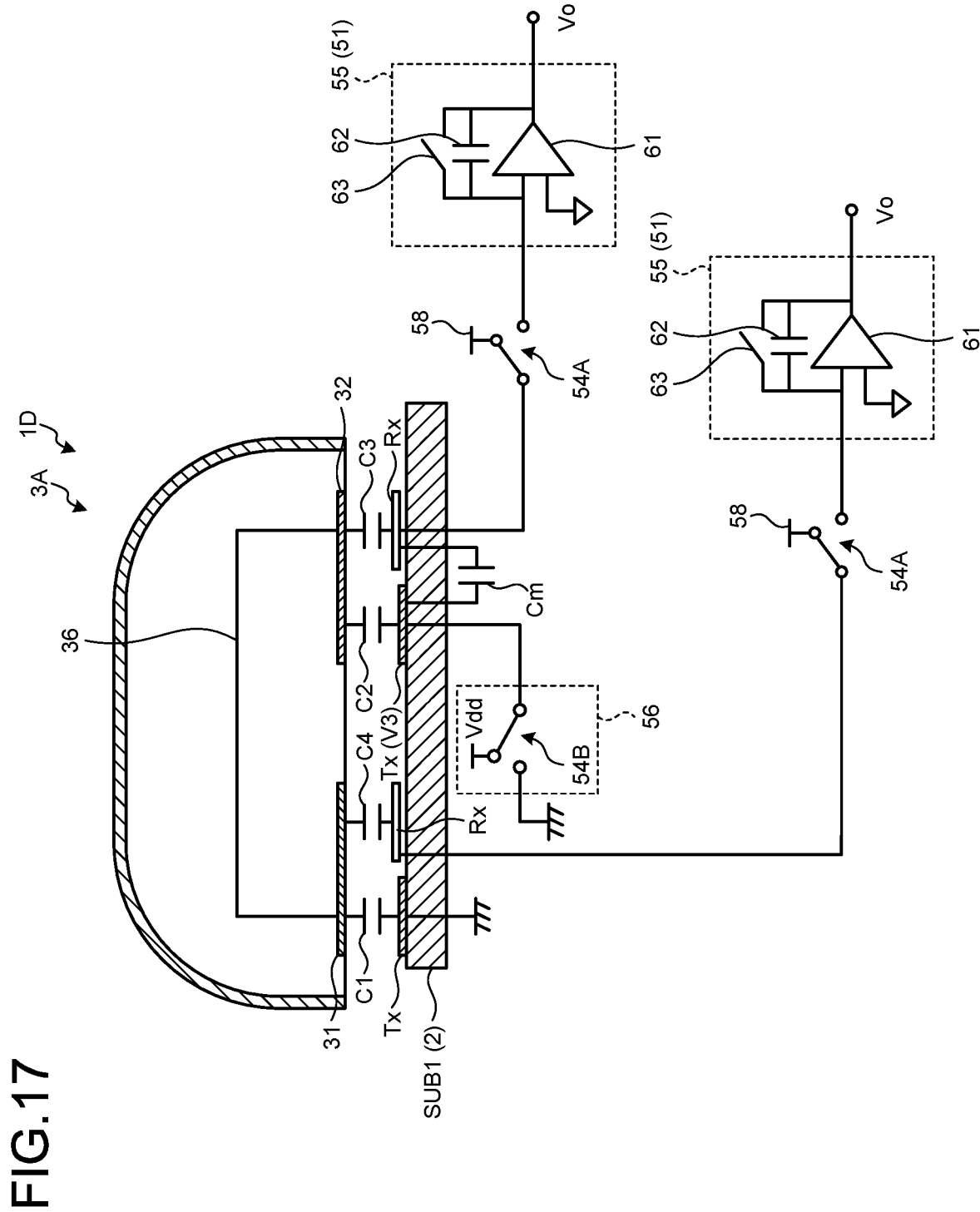
FIG. 17 is a descriptive view for schematically explaining an input support device of an input detection system according to a sixth embodiment.

FIG. 17 is a descriptive view for schematically explaining an input support device of an input detection system according to a sixth embodiment. As illustrated in FIG. 17, an input detection system 1D in the sixth embodiment differs from the first embodiment to the fifth embodiment described above in that an input support device 3A does not include the LC circuit 35. The first electrode 31 and the second electrode 32 of the input support device 3A are coupled by a wiring line 36.

In the present embodiment, one drive electrode Tx is coupled to a reference potential (for example, the reference potential Vdc), the other drive electrode Tx is coupled to the power supply potential Vdd or the reference potential (for example, the reference potential Vdc) through the switch element 54B, and the detection drive signal VD is supplied thereto, as in the above-mentioned examples. The detection electrode Rx outputs the detection signals Vdet based on the mutual electrostatic capacitance Cm.

In the present embodiment, the input support device 3A does not include the LC circuit 35. The detection flow (for example, steps ST14 and ST15 in FIG. 8) driven by the second detection drive signal VD having the resonant frequency can therefore be omitted. When the cover 103 is in the closed state, a position of the input support device 3A is previously defined by a position of the mounting opening OP2 in the cover 103, and the display opening OP1 defines a region where touch by the finger or the like can be detected. Accordingly, even with a detection method that does not use the resonance of the LC circuit 35, detection of the input support device 3A and detection of the touch by the finger or the like can be performed separately in each region. The input detection system 1D in the sixth embodiment can therefore detect the input support device 3A preferably.

Although the preferred embodiments of the present disclosure have been described above, the present disclosure is not limited by these embodiments. Contents disclosed in the embodiments are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system comprising:
a display device with a detection function that includes a plurality of detection electrodes arrayed in a display region;
an electronic apparatus case including an accommodation portion accommodating the display device with the detection function and a cover covering the display region of the display device with the detection function;
an input device that is mounted on the cover of the electronic apparatus case so as to rotate around a rotating axis extending in a normal direction to a surface of the cover and includes a first electrode and a second electrode facing the detection electrodes; and
a light transmitting protective film provided on a surface of the cover, which faces the display device with the detection function, wherein
the cover is made of a light non-transmitting material and has a mounting opening in a region overlapping with a part of the display region,
the input device is provided in a region overlapping with the mounting opening in the cover,
the protective film is provided so as to cover the mounting opening, and
the input device is fixed to the protective film.

2. The input detection system according to claim 1, wherein the cover has a display opening in a region overlapping with a part of the display region.

3. The input detection system according to claim 2, wherein the display device with the detection function performs display in an opening region overlapping with the display opening in the cover when the cover is in a closed state.

4. The input detection system according to claim 1, wherein the display device with the detection function detects the input device and stops touch detection of a detection target different from the input device when the cover is in a closed state.

5. The input detection system according to claim 2, wherein the display device with the detection function executes touch detection of a detection target different from the input device in an opening region overlapping with the display opening in the cover when the cover is in a closed state.

6. The input detection system according to claim 1, wherein
the input device includes an LC circuit,
the first electrode is coupled to one end side of the LC circuit, and
the second electrode is coupled to another end side of the LC circuit.

7. An electronic apparatus case to accommodate a display device with a detection function, the display device including a plurality of detection electrodes arrayed in a display region, the electronic apparatus case comprising:
an accommodation portion accommodating the display device with the detection function;
a cover covering the display region of the display device with the detection function;
an input device that is mounted on the cover so as to rotate around a rotating axis extending in a normal direction to a surface of the cover and includes a first electrode and a second electrode facing the detection electrodes; and
a light transmitting protective film provided on a surface of the cover, which faces the display device with the detection function, wherein
the cover is made of a light non-transmitting material and has a mounting opening in a region overlapping with a part of the display region,
the input device is provided in a region overlapping with the mounting opening in the cover,
the protective film is provided so as to cover the mounting opening, and
the input device is fixed to the protective film.

8. The electronic apparatus case according to claim 7, wherein the cover has a display opening in a region overlapping with a part of the display region.

9. The electronic apparatus case according to claim 8, wherein the display device with the detection function performs display in an opening region overlapping with the display opening in the cover when the cover is in a closed state.

10. The electronic apparatus case according to claim 7, wherein
the input device includes an LC circuit,
the first electrode is coupled to one end side of the LC circuit, and
the second electrode is coupled to another end side of the LC circuit.

\* \* \* \* \*